United States Patent
Hayashi et al.

(10) Patent No.: US 9,850,865 B2
(45) Date of Patent: Dec. 26, 2017

(54) FUEL SUPPLY DEVICE

(71) Applicant: DENSO CORPORATION, Kariya, Aichi-pref. (JP)

(72) Inventors: Norihiro Hayashi, Kariya (JP); Kiyomori Kobayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 15/305,171

(22) PCT Filed: Oct. 6, 2015

(86) PCT No.: PCT/JP2015/005068
§ 371 (c)(1),
(2) Date: Oct. 19, 2016

(87) PCT Pub. No.: WO2016/059769
PCT Pub. Date: Apr. 21, 2016

(65) Prior Publication Data
US 2017/0260943 A1 Sep. 14, 2017

(30) Foreign Application Priority Data
Oct. 13, 2014 (JP) .................................. 2014-209562

(51) Int. Cl.
*F02M 37/10* (2006.01)
*F02M 37/02* (2006.01)
(Continued)

(52) U.S. Cl.
CPC ........... *F02M 37/025* (2013.01); *B60K 15/03* (2013.01); *F02M 37/0088* (2013.01);
(Continued)

(58) Field of Classification Search
CPC ......... B60K 2015/0325; F02M 37/025; F02M 37/10; F02M 37/106
(Continued)

(56) References Cited

U.S. PATENT DOCUMENTS 6,098,600 A * 8/2000 Umetsu ................ F02M 37/025
123/514
6,113,354 A * 9/2000 Meese .................. B60K 15/077
123/514

(Continued)

FOREIGN PATENT DOCUMENTS

| JP | 5-60100 | 3/1993 |
| JP | 5-99090 | 4/1993 |
| JP | 2009-197675 | 9/2009 |

*Primary Examiner* — Erick Solis
(74) *Attorney, Agent, or Firm* — Nixon & Vanderhye PC

(57) ABSTRACT

A swirling wall structure-extends from a lower side toward an upper side in a sub-tank, and a fuel flow, which is outputted into an inside of the sub-tank from a flow outlet of a diffuser passage opened toward a lateral side, is swirled by the swirling wall structure. The swirling wall structure-includes a curved wall surface and a U-turn wall surface. The curved wall surface is curved about a longitudinal axis, which extends from the lower side toward the upper side in the sub-tank, to bend the fuel flow outputted from the flow outlet. The U-turn wall surface extends continuously from the curved wall surface to make a U-turn of the fuel flow, which is bent by the curved wall surface.

10 Claims, 20 Drawing Sheets

(51) Int. Cl.
*F02M 37/00* (2006.01)
*B60K 15/03* (2006.01)

(52) U.S. Cl.
CPC ... *F02M 37/106* (2013.01); *B60K 2015/0325* (2013.01); *B60K 2015/03144* (2013.01)

(58) Field of Classification Search
USPC .................................................. 123/497, 509
See application file for complete search history.

(56) References Cited

U.S. PATENT DOCUMENTS

| | | |
|---|---|---|
| 2002/0096220 A1 | 7/2002 | Iwamoto et al. |
| 2003/0188723 A1* | 10/2003 | Ichikawa ............ B01D 35/0273 |
| | | 123/509 |
| 2003/0188786 A1 | 10/2003 | Toki et al. |
| 2007/0217921 A1 | 9/2007 | Oohashi et al. |
| 2009/0013970 A1* | 1/2009 | Danjo .................. F02M 37/106 |
| | | 123/509 |
| 2011/0041931 A1 | 2/2011 | Villaire et al. |
| 2014/0053814 A1 | 2/2014 | Fisher et al. |
| 2016/0102683 A1 | 4/2016 | Hayashi et al. |
| 2016/0265494 A1* | 9/2016 | Niwa ..................... F02M 37/22 |

\* cited by examiner

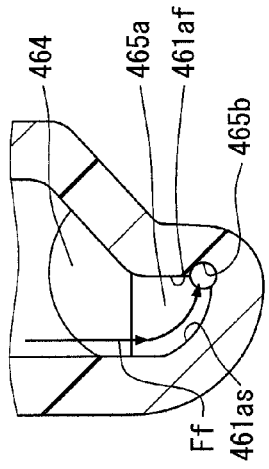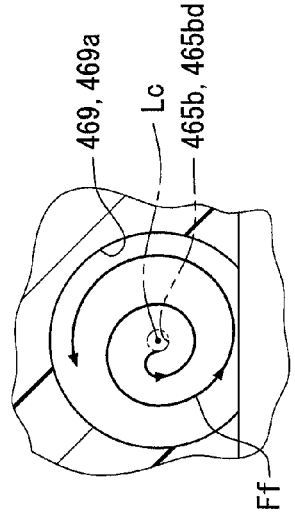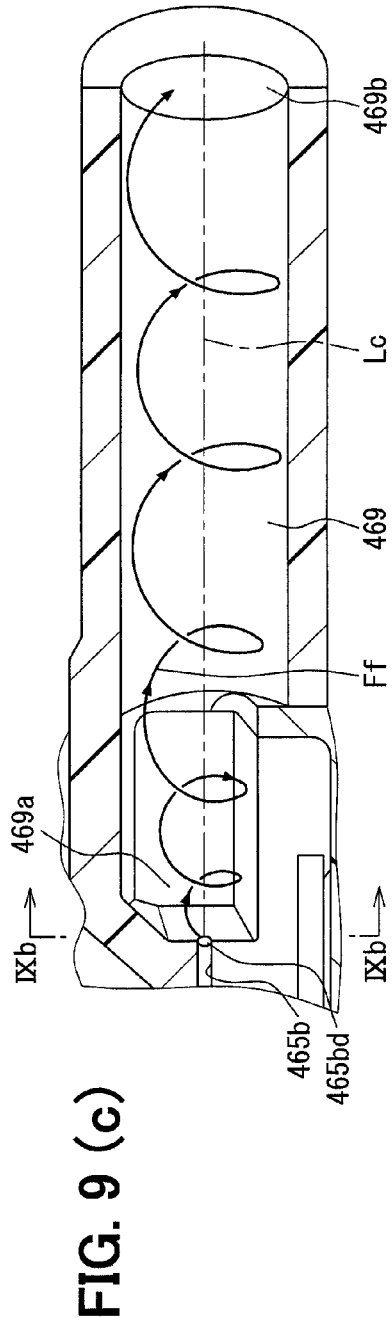
FIG. 9 (a)
FIG. 9 (b)
FIG. 9 (c)

FUEL SUPPLY DEVICE

CROSS REFERENCE TO RELATED APPLICATION

This application is the U.S. national phase of International Application No. PCT/JP2015/005068 filed on Oct. 6, 2015 which designated the U.S. and claims priority to Japanese Patent Application No. 2014-209562 filed on Oct. 13, 2014, the entire contents of each of which are hereby incorporated by reference.

TECHNICAL FIELD

The present disclosure relates to a fuel supply device that supplies fuel stored in a fuel tank to an internal combustion engine located at an outside of the fuel tank.

BACKGROUND ART

A fuel supply device, which pressurizes fuel stored in the fuel tank and discharges the pressurized fuel to the internal combustion engine through use of a fuel pump, is known from, for example, the patent literature 1. The device disclosed in the patent literature 1 has a swirling wall structure that swirls a fuel flow.

Specifically, the swirling wall structure of the device disclosed in the patent literature 1 is placed along a path, which extends from the fuel pump to the internal combustion engine, to swirl the fuel flow about an axis that extends in a vertical direction. In this way, air bubbles, which are contained in the fuel and have a small specific gravity, are concentrated in a center part of the swirl flow, so that a cluster of air bubbles is formed in the center part of the swirl flow in a manner that increases a buoyant force exerted to the air bubbles. Thus, the cluster of air bubbles is expelled from the path, which extends from the fuel pump to the internal combustion engine, through a vent hole, which extends through an upper wall of the swirling wall structure. Thereby, in the internal combustion engine, it is possible to limit deterioration of a performance, which would be caused by the intake of the fuel containing the air bubbles.

However, in the swirling wall structure of the device disclosed in the patent literature 1, the presence of the vent hole in the path, which extends between the fuel pump and the internal combustion engine, causes that a portion of the fuel to be supplied to the internal combustion engine is escaped through the vent hole, so that a sully loss of the fuel is induced. The fuel supply loss of this kind causes wasting of the drive energy of the fuel pump. Therefore, there is a need for improvement in view of the energy saving. When the leakage of the fuel is reduced by reducing a diameter of the vent hole, the air bubbles cannot be effectively expelled through the vent hole having the reduced diameter. Thereby, the air bubbles may remain in the fuel to possibly cause deterioration of the performance of the internal combustion engine.

CITATION LIST

Patent Literature

PATENT LITERATURE 1: JP2009-197675A

SUMMARY OF INVENTION

The present disclosure is made in view of the above disadvantages. Thus, it is an objective of the present disclosure to provide a fuel supply device that can achieve both of the energy saving and ensuring of the required performance of the internal combustion engine.

In order to achieve the above objective, according to a first aspect of the present disclosure, there is provided a fuel supply device that supplies fuel from a fuel tank toward an internal combustion engine located at an outside of the fuel tank, the fuel supply device including: a sub-tank that is placed in an inside of the fuel tank and is shaped into a tubular body that has a bottom, wherein an opening of the sub-tank is opened toward an upper side; a jet pump that is received in an inside of the sub-tank, wherein the jet pump discharges pressurized fuel from a nozzle passage into a diffuser passage in the jet pump and thereby pumps stored fuel, which is stored in the fuel tank, into the inside of the sub-tank through the diffuser passage; a fuel pump that is received in the inside of the sub-tank, wherein the fuel pump draws the fuel pumped into the sub-tank by the jet pump and discharges the drawn fuel toward the internal combustion engine; and a swirling wall structure that extends from a lower side toward an upper side in the sub-tank, wherein a fuel flow, which is outputted into the inside of the sub-tank from a flow outlet of the diffuser passage opened toward a lateral side, is swirled by the swirling wall structure, and the swirling wall structure, which is assumed to have a longitudinal axis extending from the lower side to the upper side of the sub-tank, includes: a curved wall surface that is curved about the longitudinal axis to bend the fuel flow outputted from the flow outlet; and a U-turn wall surface that extends continuously from the curved wall surface to make a U-turn of the fuel flow, which is bent by the curved wall surface.

At the diffuser passage, which draws the accumulate fuel from the fuel tank through the discharge of the fuel from the nozzle passage, the flow outlet opened toward the latera side discharges the fuel flow into the sub-tank, and this fuel flow is swirled by the swirling wall structure of the first aspect. Specifically, the fuel flow, which is outputted from the flow outlet, is bent along the curved wall surface that is curved about the longitudinal axis that extends from the lower side to the upper side of the sub-tank, and then this fuel flow makes the U-turn along the U-turn wall surface that extends continuously from the curved wall surface. Thereby, the fuel flow is swirled. In this way, the air bubbles, which are contained in the fuel and have the small specific gravity, are concentrated in the center part of the swirl flow to form a cluster of air bubbles in a manner that increases a buoyant force of the air bubbles. Thereby, movement of the cluster of air bubbles is less likely interfered by the swirling wall structure that extends from the lower side to the upper side in the sub-tank. Furthermore, in the sub-tank, which is shaped into the tubular body that has the bottom, an opening of the sub-tank, through which the jet pump and the fuel pump are insertable into the inside of the sub-tank, opens toward the upper side. Therefore, the cluster of air bubbles can be easily expelled by the upward movement of the cluster of air bubbles. Furthermore, the fuel, which is received in the sub-tank and from which the air bubbles are removed by the swirling wall structure, can be entirely drawn into and discharged from the fuel pump toward the internal combustion engine. Thereby, the supply loss of the fuel can be limited.

According to the first aspect of the present disclosure, in addition to the energy saving, which is implemented by limiting the supply loss of the fuel, the required performance of the internal combustion engine can be achieved by the removal of the air bubbles.

Furthermore, in the fuel supply device according to a second aspect of the present disclosure, the jet pump described above is a first jet pump, which pumps the stored fuel of the fuel tank from a location on a lower side of the sub-tank into the inside of the sub-tank, and the fuel supply device includes a second jet pump that is received in the inside of the sub-tank. The second jet pump discharges pressurized fuel from a nozzle passage into a diffuser passage in the second jet pump and thereby pumps the stored fuel of the fuel tank from a corresponding location of the fuel tank, which is other than the location on the lower side of the sub-tank, into the inside of the sub-tank through the diffuser passage of the second jet pump, and the swirling wall structure includes a confluence opening, through which a fuel flow outputted from a flow outlet of the diffuser passage of the second jet pump is merged with the fuel flow outputted from the flow outlet of the diffuser passage of the first jet pump.

According to the second aspect, the fuel flow, which is outputted from the second jet pump, is merged with the fuel flow, which is outputted from the flow outlet of the first jet pump and is swirled by the swirling wall structure, through the confluence opening to form the swirl flow. Therefore, it is possible to remove the air bubbles from the fuel, which is pumped by the first jet pump from the location on the lower side of the sub-tank, and also the air bubbles from the fuel, which is pumped by the second jet pump from the other location that is other than the location on the lower side of the sub-tank. Thereby, the swirling wall structure, which removes the air bubbles and limits supply loss of the fuel, is commonly used by the first jet pump and the second jet pump to simplify the structure and to achieve both of the energy saving and the required performance of the internal combustion engine.

BRIEF DESCRIPTION OF DRAWINGS

FIG. 9($a$) is a schematic diagram, which corresponds to a cross sectional view taken along line IV-IV in FIG. 2 and is for describing a fuel flow generated in the fuel supply device of FIG. 1, and FIG. 9($b$) is a schematic diagram, which corresponds to a cross sectional view taken along line Ixb-Ixb in FIG. 9($c$) and is for describing the fuel flow generated in the fuel supply device of FIG. 1, and FIG. 9($c$) is a schematic diagram, which corresponds to a cross sectional view taken along line in FIG. 2 and is for describing the fuel flow generated in the fuel supply device of FIG. 1.

DESCRIPTION OF EMBODIMENTS

Various embodiments of the present disclosure will be described with reference to the drawings. In the following respective embodiments, similar components are indicated by the same reference signs and may not be redundantly described. In a case where only some parts of the construction of each of the embodiments are described, the construction of the previously described embodiment may be applied to the rest of the construction of the embodiment. Furthermore, besides the explicitly indicated combination of the components described in each of the following embodiments, the components of different embodiments may be partially combined as long as such a combination does not cause a problem.

First Embodiment

Figure 1:
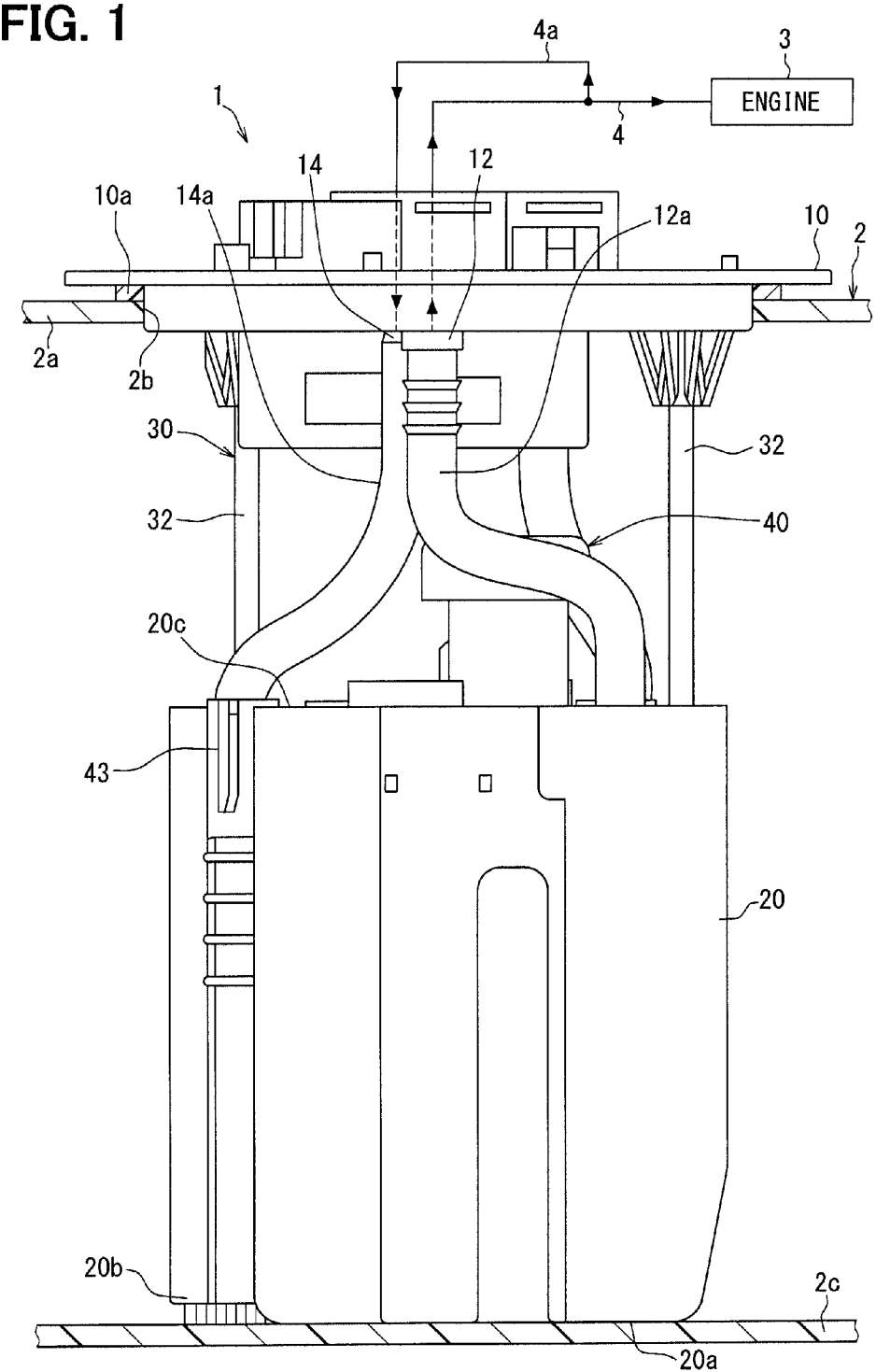
FIG. 1 is a front view showing a fuel supply device according to a first embodiment of the present disclosure.

As shown in FIG. 1, a fuel supply device 1 according to a first embodiment of the present disclosure is installed in a fuel tank 2 of a vehicle. The device 1 supplies fuel, which is stored in the fuel tank 2, to fuel injection valves of an internal combustion engine 3 indirectly through another intervening device, such as a high pressure pump, or directly without through such an intervening device. The fuel tank 2, in which the device 1 is installed, is made of resin or metal and is shaped into a hollow form to accumulate the fuel to be supplied to the internal combustion engine 3. The internal combustion engine 3, to which the fuel is supplied from the device 1, may be a diesel engine or a gasoline engine. In FIGS. 1 and 3-6, a top-to-bottom direction and a transverse direction respectively coincide with a vertical direction and a horizontal direction of the vehicle placed on a horizontal plane (hereinafter, simply referred to as a vertical direction and a horizontal direction).

(Structure and Operation)

Hereinafter, a structure and an operation of the device 1 will be described.

As shown in FIGS. 1 to 4, the device 1 includes a flange 10, a sub-tank 20, an adjusting mechanism 30, a pump unit 40, and a swirling wall structure 50.

Figure 2:
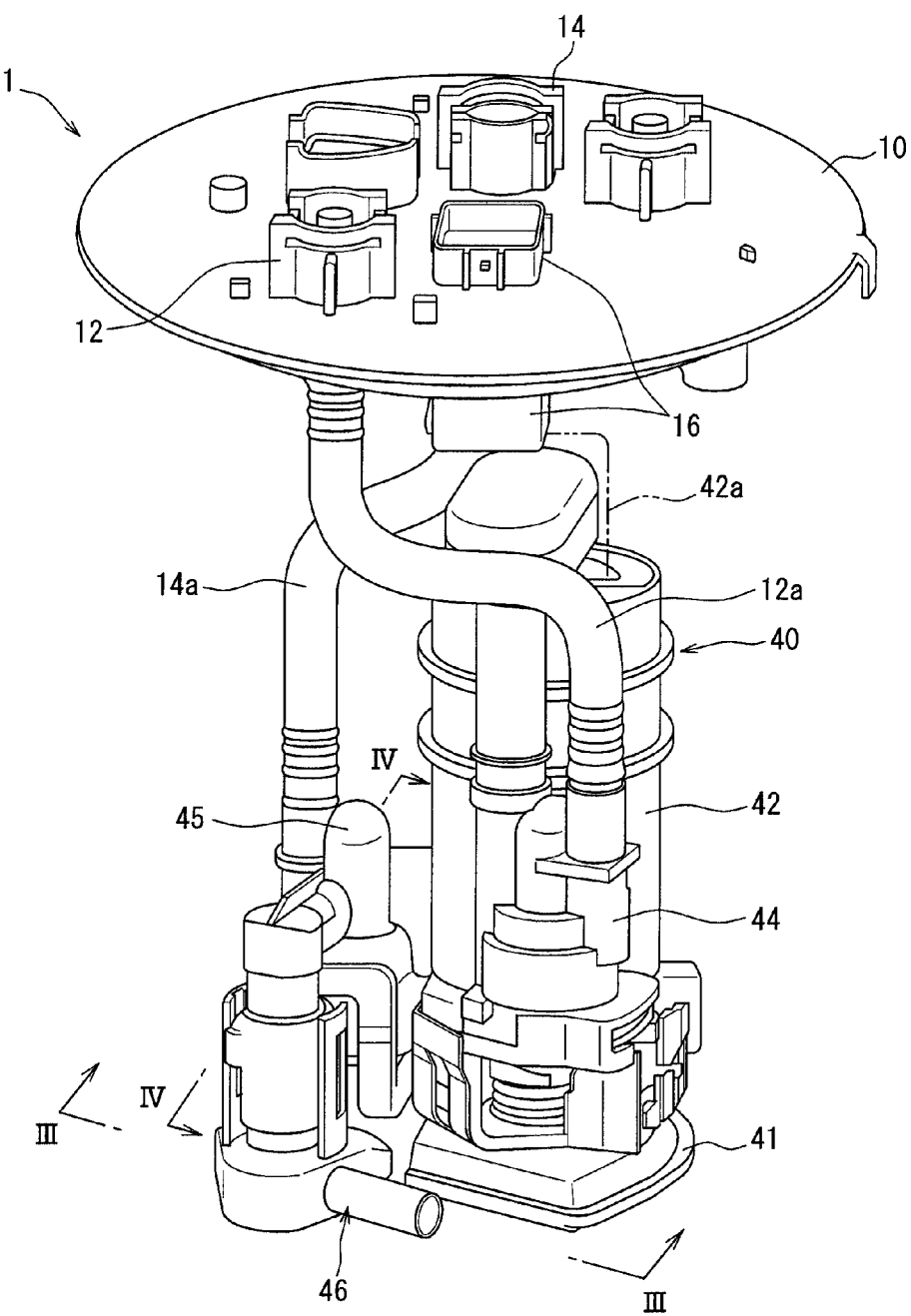
FIG. 2 is a perspective view showing the fuel supply device of FIG. 1.

As shown in FIG. 1, the flange 10 is made of resin and is shaped into a circular plate form. The flange 10 is installed to a top plate portion 2a of the fuel tank 2. A packing 10a is clamped between the top plate portion 2a and the flange 10, so that a through-hole 2b, which is formed in the top plate portion 2a, is closed. As shown in FIGS. 1 and 2, the flange 10 has a fuel supply conduit 12, a return conduit 14 and an electrical connector 16, which are integrally assembled to the flange 10.

The fuel supply conduit 12 is communicated with the pump unit 40, which is received in the fuel tank 2, though a flexible tube 12a that is flexible. Furthermore, at the outside of the fuel tank 2, the fuel supply conduit 12 is communicated to a fuel path 4 that connects between the fuel tank 2 and the internal combustion engine 3. The fuel supply conduit 12 supplies the fuel, which is pumped by a fuel pump 42 of the pump unit 40, from the inside of the fuel tank 2 to the internal combustion engine 3 located at the outside of the fuel tank 2. The return conduit 14 is communicated with a branch passage 4a, which is branched from the fuel path 4 at the outside of the fuel tank 2. Furthermore, the return conduit 14 is communicated with the pump unit 40 received in the fuel tank 2 through a flexible tube 14a that is flexible. The return conduit 14 returns the return fuel, which is branched at the outside of the fuel tank 2 from the flow of the supply fuel to be supplied to the internal combustion engine 3, to a residual pressure holding valve 45 of the pump unit 40 received in the fuel tank 2. As shown in FIG. 2, the electrical connector 16 electrically connects the fuel pump 42 to a control circuit (not shown) located at the outside of the fuel tank 2.

Figure 3:
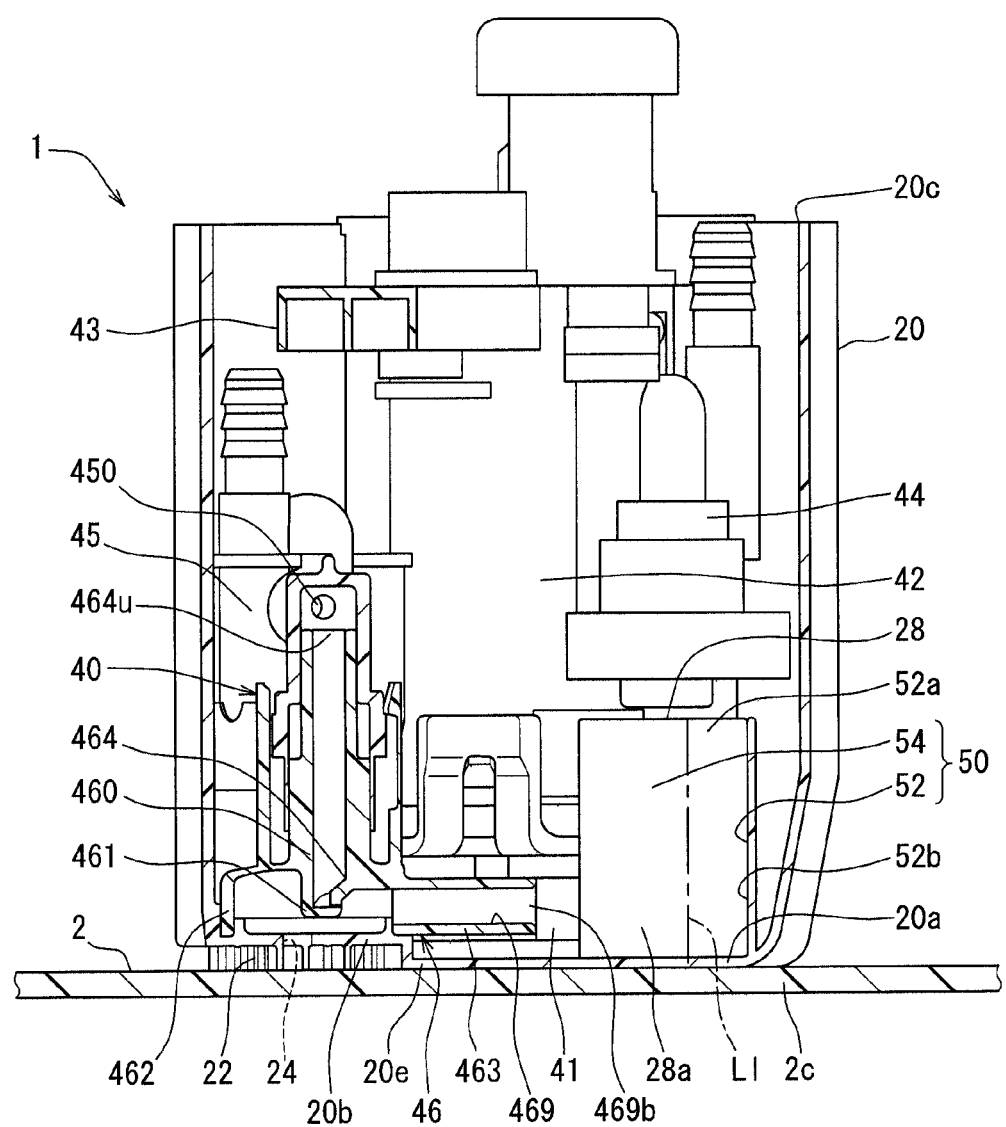
FIG. 3 is a cross sectional view taken along line III-III in FIG. 2.
Figure 4:
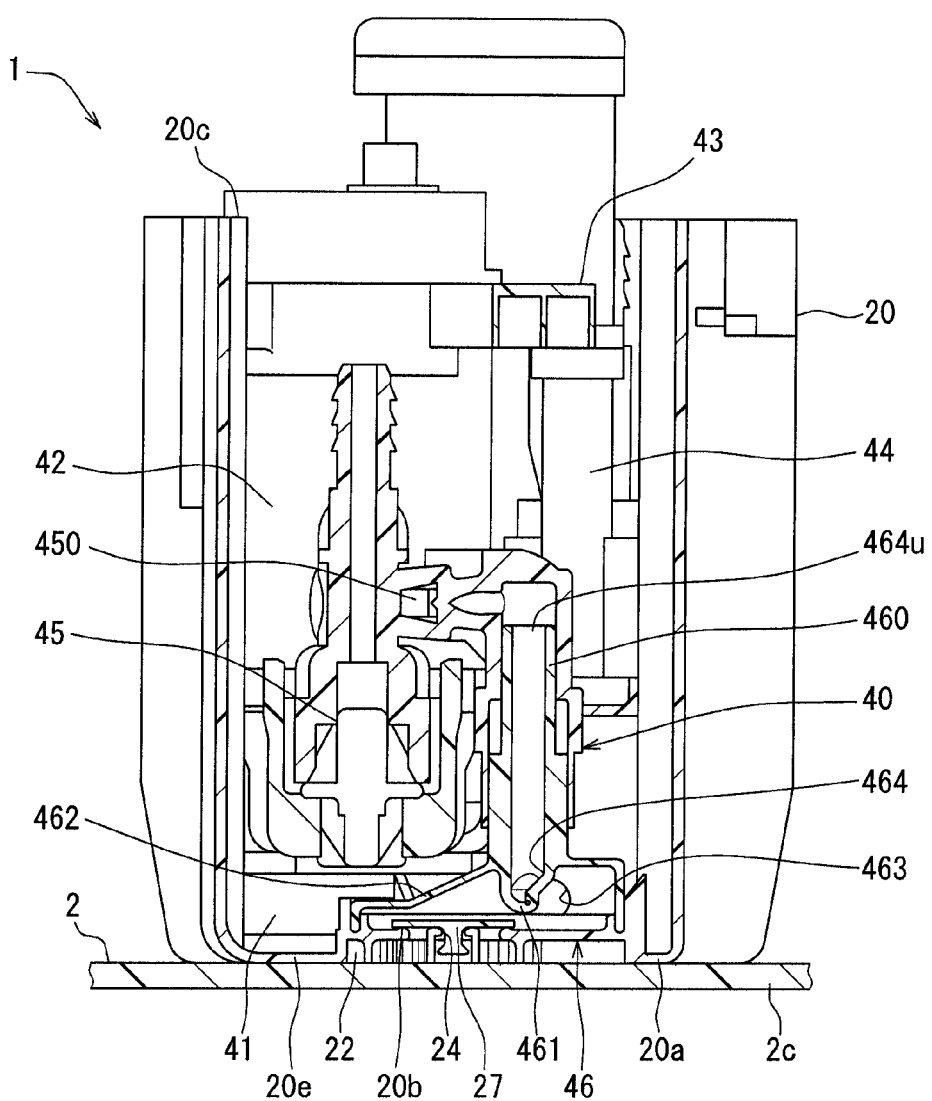
FIG. 4 is a cross sectional view taken along line IV-IV in FIG. 2.

With reference to FIGS. 1, 3 and 4, the sub-tank 20 is made of resin and is shaped into a cylindrical tubular body having a bottom, and the sub-tank 20 is placed in the inside of the fuel tank 2. An opening 20c of the sub-tank 20 opens toward the upper side. A bottom portion 20a of the sub-tank 20 is placed on a bottom portion 2c of the fuel tank 2. As shown in FIGS. 3 and 4, a flow inlet 24 is formed in a recessed bottom part 20b, which is upwardly recessed from a deepest bottom part 20e of the bottom portion 20a. The flow inlet 24 is communicated with an inflow space 22, which is defined between the recessed bottom part 20b and the bottom portion 2c. Furthermore, the flow inlet 24 is communicated with a jet pump 46 of the pump unit 40. The fuel stored in the fuel tank 2 flows into the flow inlet 24 through the inflow space 22 located on the lower side of the sub-tank 20, and then this fuel is pumped by the jet pump 46 into the inside of the sub-tank 20. An umbrella valve 27 shown in FIG. 4 is installed on the recessed bottom part 20b of the present embodiment in such a manner that the umbrella valve 27 opens the flow inlet 24 when a negative pressure is applied to the umbrella valve 27 from the jet pump 46 as described in detail later.

As shown in FIG. 1, the adjusting mechanism 30 includes a pair of support shafts 32 and an adjusting spring (not shown). Each support shaft 32 is made of metal and is shaped into a cylindrical form. The support shaft 32 extends in the top-to-bottom direction in the inside of the fuel tank 2. An upper end part of each support shaft 32 is fixed to the flange 10. A portion of each support shaft 32, which is located below the upper end part of the support shaft 32, is guided by the sub-tank 20 in such a manner that the support shaft 32 is slidable in the top-to-bottom direction. The adjusting spring is placed coaxially around a corresponding one of the pair of support shafts 32 in the inside of the sub-tank 20 and is thereby interposed between the sub-tank 20 and the corresponding support shaft 32. As shown in FIGS. 1, 3 and 4, the adjusting spring urges the bottom portion 20a of the sub-tank 20 against the bottom portion 2c of the fuel tank 2.

The pump unit 40 is received in the inside of the sub-tank 20. As shown in FIGS. 2 to 4, the pump unit 40 includes a suction filter 41, the fuel pump 42, a pump holder 43, a relief valve 44, the residual pressure holding valve 45 and the jet pump 46.

The suction filter 41 is, for example, a nonwoven fabric filter and is placed above the deepest bottom part 20e of the bottom portion 20a in the inside of the sub-tank 20. The suction filter 41 filters the fuel, which is drawn from the inside of the sub-tank 20 into the fuel pump 42, to remove foreign objects contained in the drawn fuel.

The fuel pump 42 is connected to an upper side of the suction filter 41 in the inside of the sub-tank 20. The fuel pump 42 is an electric pump in the present embodiment and is electrically connected to the electrical connector 16 through a flexible wiring 42a that is flexible. The operation of the fuel pump 42 is controlled by the control circuit through the electrical connector 16. When the fuel pump 42 is operated, the fuel pump 42 pressurizes the fuel drawn through the suction filter 41 in the inside of the sub-tank 20.

With reference to FIGS. 1, 3 and 4, the pump holder 43 is made of resin and is shaped into an arm form. The pump holder 43 is installed to the opening 20c of the sub-tank 20. The pump holder 43 supports the fuel pump 42 from a radially outer side of the fuel pump 42.

As shown in FIGS. 2 to 4, the relief valve 44 is connected to a lateral side of the fuel pump 42 in the inside of the sub-tank 20. The relief valve 44 is communicated with an outlet (not shown) of the fuel pump 42. Also, the relief valve 44 is communicated with the fuel supply conduit 12 through the flexible tube 12a. Furthermore, the relief valve 44 is also communicated with the inside of the sub-tank 20. When the pressure of the fuel, which is discharged from the fuel pump 42 and is supplied to the internal combustion engine 3 side, is less than a relief pressure, the relief valve 44 is closed to ensure the required pressure of the supplied fuel that is supplied to the internal combustion engine 3. In contrast, when the pressure of the fuel, which is supplied to the internal combustion engine 3, becomes equal to or larger than the relief pressure, the relief valve 44 is opened to release the fuel to the inside of the sub-tank 20.

The residual pressure holding valve 45 is connected to the lateral side of the fuel pump 42 in the inside of the sub-tank 20. The residual pressure holding valve 45 is communicated with the return conduit 14 through the flexible tube 14a. The residual pressure holding valve 45 is also communicated with the jet pump 46. When the pressure of the fuel, which is supplied to the internal combustion engine 3, is equal to or larger than a valve opening pressure of the residual pressure holding valve 45, the residual pressure holding valve 45 is opened, so that a portion of the fuel supplied to the internal combustion engine 3 side is discharged from the discharge outlet 45o to the jet pump 46 side. In contrast, when the pressure of the fuel, which is supplied to the internal combustion engine 3 side, becomes less than a valve closing pressure of the residual pressure holding valve 45, the residual pressure holding valve 45 is closed to hold the pressure of the fuel supplied to the internal combustion engine 3 side.

The jet pump 46 is made of resin and is shaped into a hollow form. The jet pump 46 is connected to a lateral side of the residual pressure holding valve 45 in the inside of the sub-tank 20. As shown in FIGS. 3 and 4, the jet pump 46 is placed on the recessed bottom part 20b of the bottom portion 20a of the sub-tank 20. The jet pump 46 includes a pressurizing portion 460, a nozzle portion 461, a suctioning portion 462 and a diffuser portion 463, which are molded integrally.

The pressurizing portion 460 forms a pressurizing passage 464 that is in a form of a cylindrical hole, which extends straight in the top-to-bottom direction. Specifically, the pressurizing portion 460 is a resin portion that forms the pressurizing passage 464. An upstream end 464u of the pressurizing passage 464 is communicated with the discharge outlet 450 of the residual pressure holding valve 45. The pressurizing passage 464 guides the pressurized fuel, which is discharged from the discharge outlet 450 to the upstream end 464u, toward a downstream end 464d of the pressurizing passage 464.

The nozzle portion 461 includes a communication forming part 461a and a flow restriction forming part 461b on the lower side of the pressurizing portion 460. The communication forming part 461a forms a communicating passage part 465a as an upstream part of a nozzle passage 465. The flow restriction forming part 461b forms a flow restricting passage part 465b as a downstream part of the nozzle passage 465. Specifically, the nozzle portion 461, which is a resin portion that forms the nozzle passage 465, is formed by a combination of the communication forming part 461a, which is a resin part that forms the communicating passage part 465a, and the flow restriction forming part 461b, which is a resin part that forms the flow restricting passage part 465b.

Figure 5:
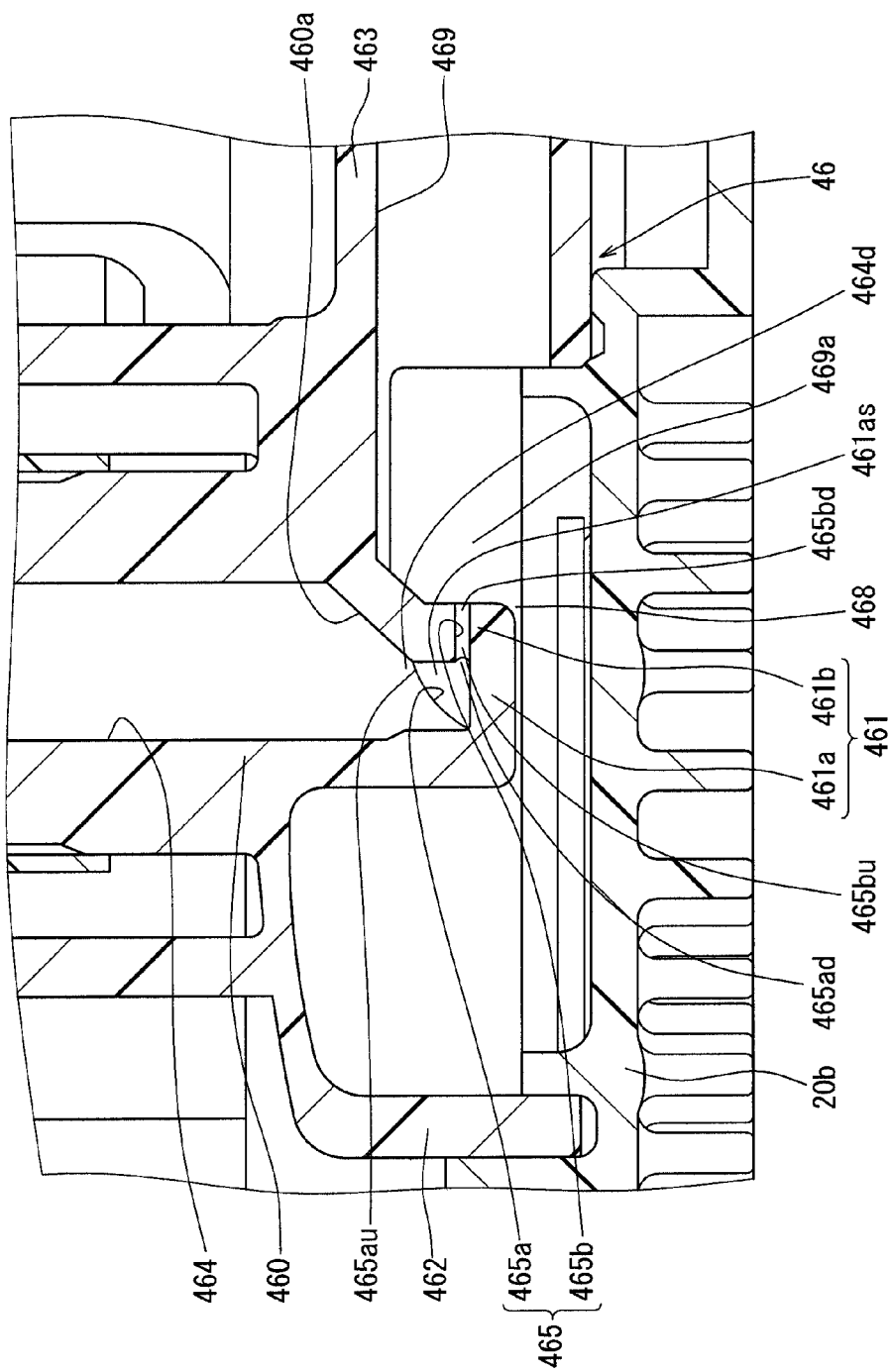
FIG. 5 is an enlarged cross sectional view of a portion of FIG. 3.
Figure 6:
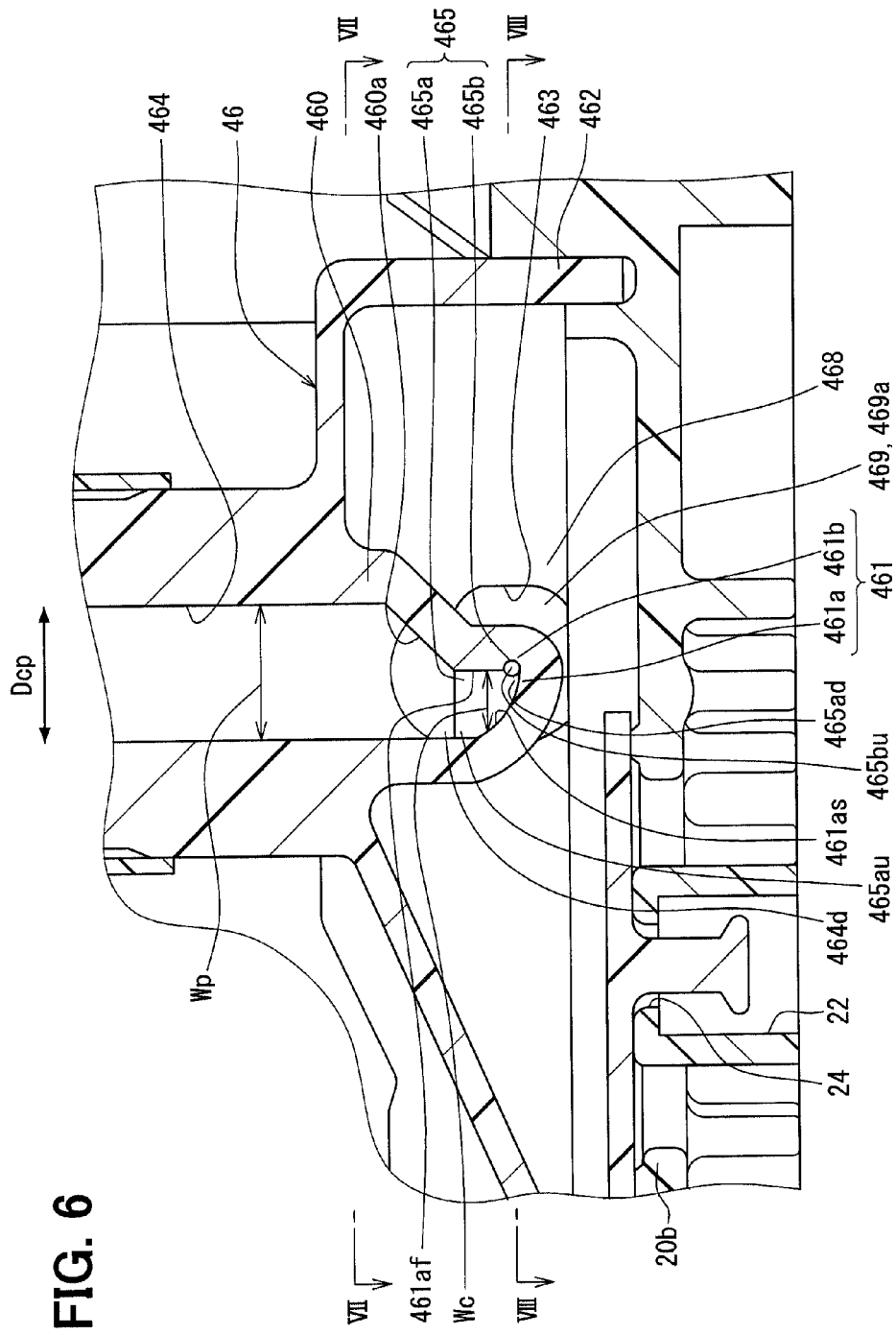
FIG. 6 is an enlarged cross sectional view of a portion of FIG. 4.
Figure 7:
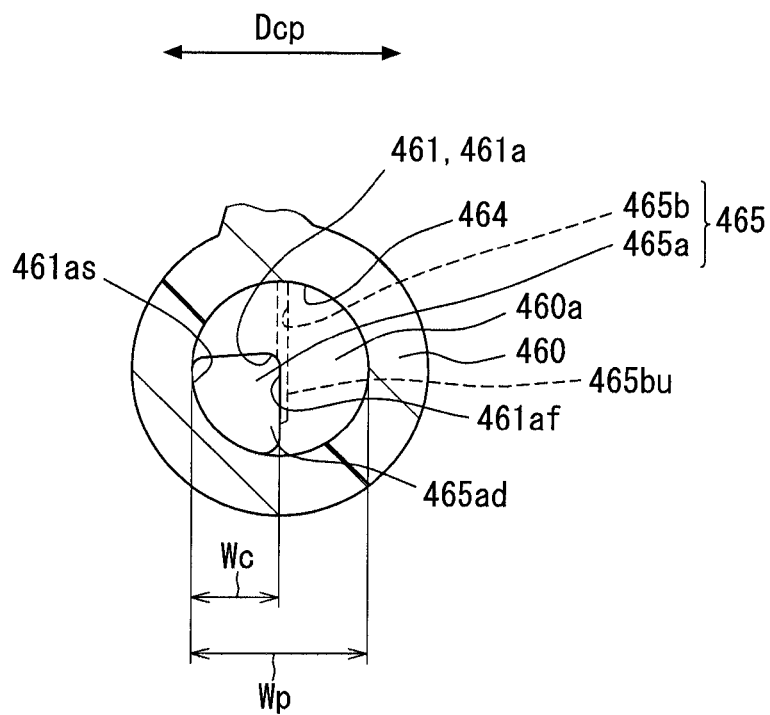
FIG. 7 is a cross sectional view taken along line VII-VII in FIG. 6.
Figure 8:
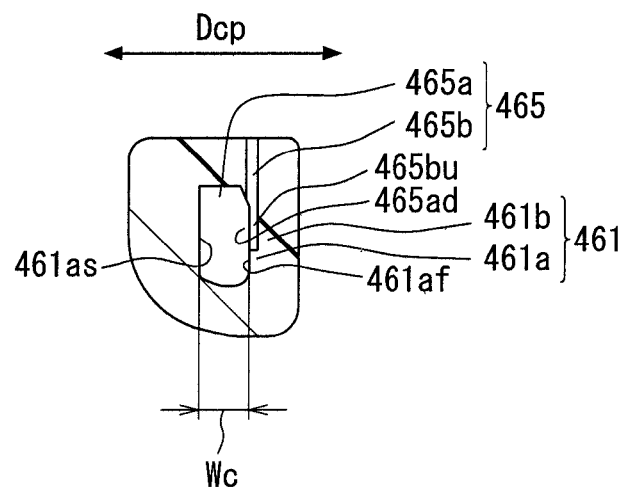
FIG. 8 is a cross sectional view taken along line VIII-VIII in FIG. 6.

The communication forming part 461a is a space that is shaped in a form of a substantially ⅛ sphere. An upstream end 465au of the communicating passage part 465a is communicated with a downstream end 464d of the pressurizing passage 464. The transverse direction in FIGS. 6 to 8 is defined as a common width direction Dcp, which defines a passage width Wc of the communicating passage part 465a and a passage width Wp of the pressurizing passage 464. The passage width Wc of the communicating passage part 465a is set to be smaller than the passage width Wp of the pressurizing passage 464. Furthermore, in order to implement the above settings, as shown in FIGS. 5 to 7, a tapered passage wall surface 460a is formed in a part of the pressurizing portion 460, which forms the downstream end 464d of the pressurizing passage 464, except a connection to the communicating passage part 465a. The tapered passage wall surface 460a is in a form of a conical surface and has a progressively reducing diameter that is progressively reduced toward the communicating passage part 465a.

As shown in FIGS. 5 to 8, a first passage wall surface 461af and a second passage wall surface 461as are formed at two opposite sides, respectively, of the communicating passage part 465a, which are opposed to each other in the common width direction Dcp, in the communication forming part 461a. The first passage wall surface 461af is in a form of a planar surface that extends in both of the transverse direction, which is substantially perpendicular to the common width direction Dcp, and the top-to-bottom direction. An upstream end 465bu of the flow restricting passage part 465b opens in a part of the first passage wall surface 461af, which forms a downstream end 465ad of the communicating passage part 465a. In the present embodiment, the upstream end 465bu of the flow restricting passage part 465b is formed at a location that is further spaced from the second passage wall surface 461as in comparison to the first passage wall surface 461af except a projected part of the upstream end 465bu, which projects from the first passage wall surface 461af toward the second passage wall surface 461as.

In comparison to the first passage wall surface 461af discussed above, the second passage wall surface 461as is curved toward the flow restricting passage part 465b and is shaped in a form of a substantially ⅛ sphere. The second passage wall surface 461as of the present embodiment is continuously curved from a location, which is spaced toward the downstream side from the downstream end 464d of the pressurizing passage 464, to the flow restricting passage part 465b. Furthermore, in the cross sectional view of FIG. 6, which shows the upstream end 465bu of the flow restricting passage part 465b seen from the communicating passage part 465a side, the second passage wall surface 461as of the present embodiment is curved in a counterclockwise direction from the pressurizing passage 464 side. The passage width Wc of the communicating passage part 465a, which is located between the wall surfaces 461af, 461as, is progressively reduced toward the flow restricting passage part 465b within an extent that is smaller than the passage width Wp of the pressurizing passage 464. In the communicating passage part 465a, as indicated by an arrow in FIG. 9(a), a fuel flow Ff is generated when the pressurized fuel flows from the pressurizing passage 464 into the communicating passage part 465a. The fuel flow Ff flows along the second passage wall surface 461as and is thereby swirled and enters the flow restricting passage part 465b located on the downstream side of the communicating passage part 465a.

As shown in FIGS. 5 to 8, the flow restriction forming part 461b, which is molded integrally at a lateral side of the communication forming part 461a, forms the flow restricting passage part 465b in a form of a cylindrical hole that extends straight in the transverse direction that is substantially perpendicular to the common width direction Dcp. The upstream end 465bu of the flow restricting passage part 465b opens in the first passage wall surface 461af, so that the upstream end 465bu of the flow restricting passage part 465b is communicated with the downstream end 465ad of the communicating passage part 465a. A flow rate of the fuel in the flow restricting passage part 465b is further restricted in comparison to a flow rate of the fuel in the communicating passage part 465a. As indicated by the arrow in FIG. 9(a), the fuel flow Ff is swirled along the second passage wall surface 461as and is supplied from the communicating passage part 465a to the flow restricting passage part 465b. Therefore, as shown in FIG. 9(b), the fuel flow Ff, the flow rate of which is restricted, is outputted in a swirling state from a downstream end 465bd of the flow restricting passage part 465b.

As shown in FIGS. 5 and 6, the suctioning portion 462 forms a suction passage 468 in a form of a planar space. The suction passage 468 is placed on the upper side of and covers the flow inlet 24, which extends through the recessed bottom part 20b. Specifically, the suctioning portion 462 is a resin portion that forms the suction passage 468. At the lower side of the pressurizing portion 460 and the nozzle portion 461, the suction passage 468 is communicated with the flow inlet 24. The fuel, which is stored in the fuel tank 2, can flow into the suction passage 468 through the inflow space 22 and the flow inlet 24 held in the valve opening state.

The diffuser portion 463 forms a diffuser passage 469 in a form of a cylindrical hole that coaxially extends from the flow restricting passage part 465b toward the lateral side in the transverse direction. Specifically, the diffuser portion 463 is a resin portion that forms the diffuser passage 469. An upstream end of the diffuser passage 469 cooperates with the suction passage 468 to form a confluence passage portion 469a, which is communicated with the downstream end 465bd of the flow restricting passage part 465b on the lower side of the pressurizing portion 460. As shown in FIG. 3, a downstream end of the diffuser passage 469 forms a flow outlet 469b, which opens in the transverse direction and is communicated with the inside of the sub-tank 20. With the above-described structure, the pressurized fuel, the flow rate of which is restricted, is discharged from the downstream end 465bd of the flow restricting passage part 465b into the confluence passage portion 469a, so that a negative pressure is generated around the discharged fuel flow, and thereby, the supplied fuel, which is supplied from the opened flow inlet 24 into the suction passage 468, is drawn into the diffuser passage 469. Thus, the drawn fuel receives a diffuser effect in the diffuser passage 469 and is thereby pumped, so that the fuel is pumped into the sub-tank 20 through the flow outlet 469b of the diffuser passage 469.

At this time, as shown in FIGS. 9(b) and 9(c), the fuel in the swirling state is discharged into the confluence passage portion 469a, so that the fuel flow Ff generated in the diffuser passage 469 forms a liquid film along the entire passage cross section and is outputted from the flow outlet 469b into the inside of the sub-tank 20. In the present embodiment, a transverse axis Lc, which extends in the transverse direction from the flow restricting passage part 465b, is assumed to be present. Under this assumption, since the second passage wall surface 461as is curved from the pressurizing passage 464 in the counterclockwise direction, the fuel flow Ff is generated in the diffuser passage 469 in such a manner that the fuel flow Ff is swirled in the counterclockwise direction about the transverse axis Lc in a view taken from the flow restricting passage part 465b.

Figure 10:
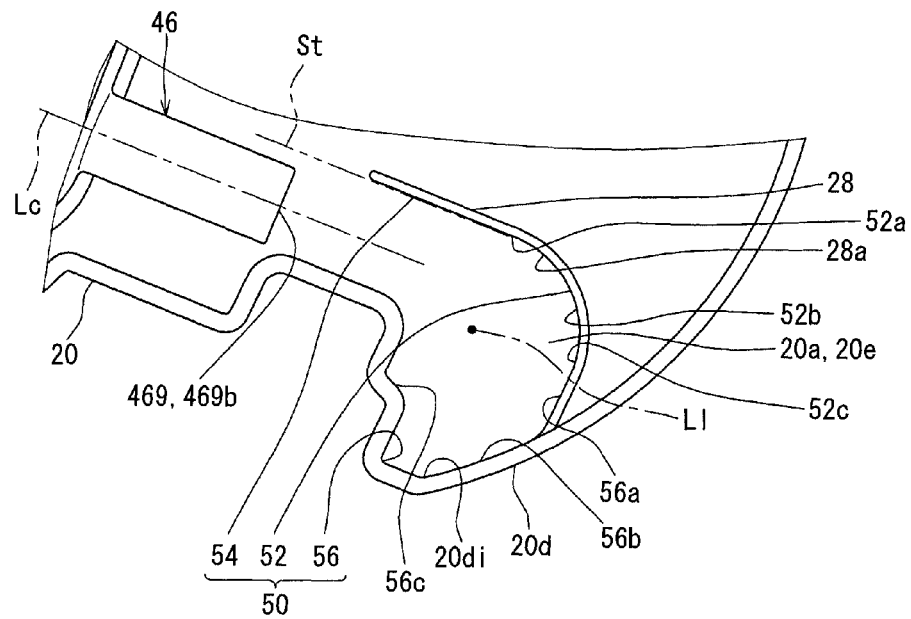
FIG. 10 is a top view showing the fuel supply device of FIG. 1.
Figure 11:
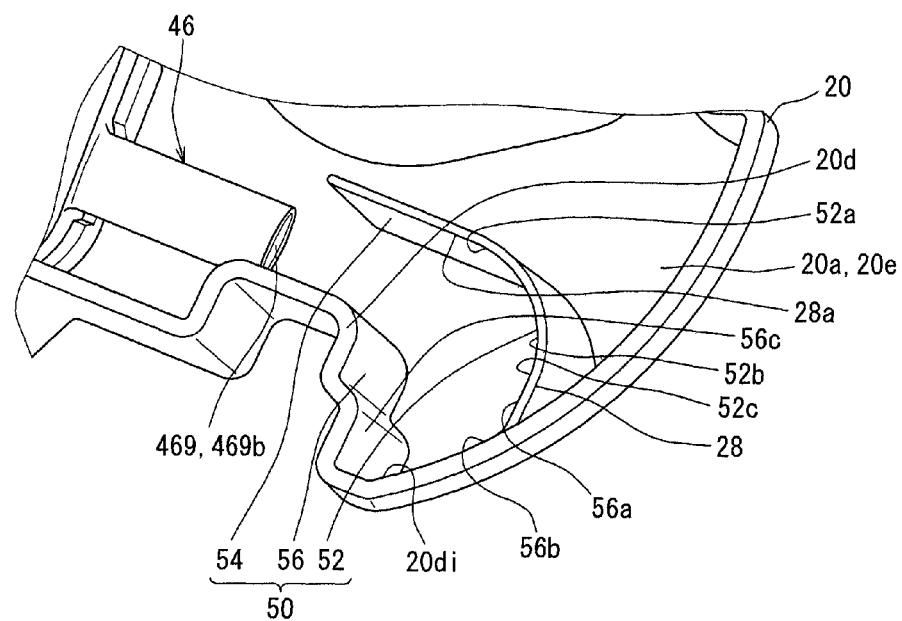
FIG. 11 is a top perspective view showing the fuel supply device of FIG. 1.

As shown in FIGS. 3, 10 and 11, the swirling wall structure 50 extends from the lower side toward the upper side in the inside of the sub-tank 20. Specifically, the swirling wall structure 50 includes a curved wall surface 52, a guide wall surface 54 and a U-turn wall surface 56.

The curved wall surface 52 is formed by a portion of a specific plate surface 28a of a longitudinal wall portion 28, which is shaped into a plate form and is integrally molded together with the sub-tank 20. The curved wall surface 52 is substantially perpendicular to the deepest bottom part 20e, which is formed in the bottom portion 20a of the sub-tank 20 and extends in the horizontal direction, so that the curved wall surface 52 extends in the vertical direction that substantially coincides with the top-to-bottom direction. Furthermore, the curved wall surface 52 extends continuously on both of the upper side and the lower side of the flow outlet 469b, which is located on the lateral side of the curved wall surface 52 and is opposed to the curved wall surface 52.

As shown in FIGS. 3 and 10, in the swirling wall structure 50, a longitudinal axis LI, which extends from the lower side to the upper side of the sub-tank 20, particularly in the vertical direction is assumed to be present. The curved wall surface 52 is curved about the longitudinal axis LI in a form of a cylindrical concave surface (i.e., a form of an arcuate surface) that circumferentially extends substantially ¼ turn. In a top view, the curved wall surface 52 of the present embodiment is curved from an adjacent end 52a of the curved wall surface 52, which is adjacent to the flow outlet 469b, in a clockwise direction.

Figure 12:
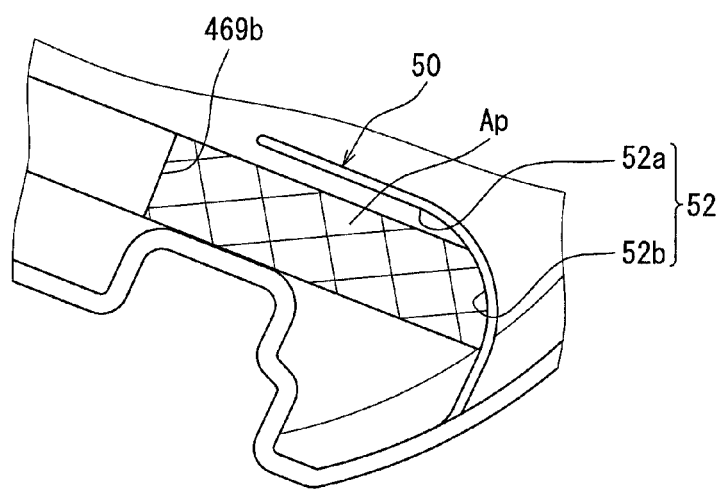
FIG. 12 is a schematic diagram for describing a swirling wall structure of FIG. 10.

Furthermore, in the swirling wall structure 50, as indicated by a cross hatching in FIG. 12, a projected area Ap, which is formed by projecting the flow outlet 469b toward the lateral side along the transverse axis Lc, is assumed to be present. Under this assumption, in the top view of the curved wall surface 52, the adjacent end 52a, which is adjacent to the flow outlet 469b, is located at an outside of the projected area Ap. Furthermore, a portion of the curved wall surface 52, which is placed in the projected area Ap, forms a spaced curved portion 52b (see also FIGS. 3, 10 and 11), which is curved and is further spaced from the flow outlet 469b in comparison to the adjacent end 52a in the top view of the curved wall surface 52.

Figure 13:
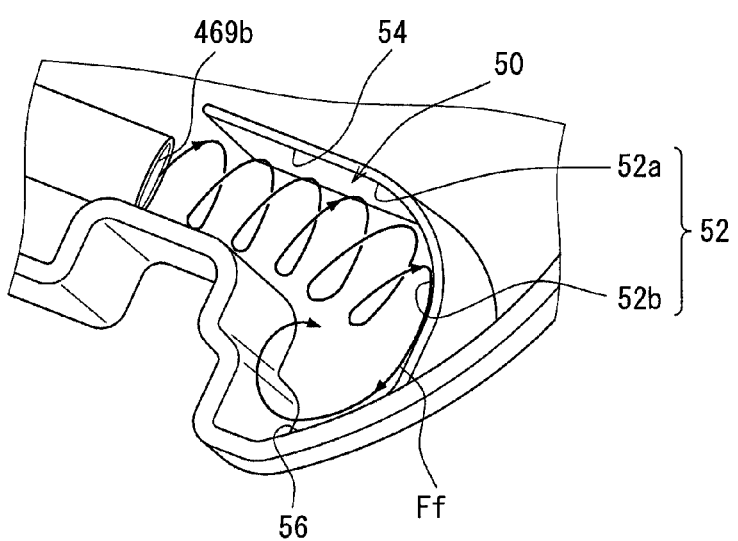
FIG. 13 is a schematic diagram for describing the fuel flow generated in the fuel supply device of FIG. 1.

With the above-described structure, the fuel flow Ff, which is outputted from the flow outlet 469b as indicated by an arrow in FIG. 13, collides against the spaced curved portion 52b of the curved wall surface 52, so that the fuel flow Ff is bent along the curved wall surface 52. At this time, the fuel flow Ff of the present embodiment is bent in the clockwise direction in the top view.

As indicated in FIGS. 3, 10 and 11, the guide wall surface 54 is formed by another portion of the specific plate surface 28a of the longitudinal wall portion 28, which is in common with the curved wall surface 52. Similar to the curved wall surface 52, the guide wall surface 54 is substantially perpendicular to the deepest bottom part 20e of the bottom portion 20a, so that the guide wall surface 54 extends in the vertical direction, and the guide wall surface 54 continuously extends on both of the upper side and the lower side of the flow outlet 469b. The guide wall surface 54 is in a form of a planar surface and continuously extends from the adjacent end 52a of the curved wall surface 52, which is adjacent to the flow outlet 469b, toward the flow outlet 469b in the top view.

As shown in FIG. 10, the guide wall surface 54 of the present embodiment is formed along a tangent plane St, which is tangent to the arcuate curved wall surface 52 at the adjacent end 52a, so that the guide wall surface 54 extends along the transverse axis Lc, which is substantially perpendicular to the longitudinal axis LI. With the above-described structure, the guide wall surface 54 guides the fuel flow Ff, which is outputted from the flow outlet 469b, to the curved wall surface 52, as indicated by the arrow in FIG. 13. The fuel flow Ff, which is guided by the guide wall surface 54, can collide against the spaced curved portion 52b of the curved wall surface 52, which is curved continuously from the guide wall surface 54, so that the fuel flow Ff can receive the curving effect described above.

The U-turn wall surface 56 is formed by another portion of the specific plate surface 28a of the longitudinal wall portion 28, which is in common with the curved wall surface 52 and the guide wall surface 54, and a portion of an inner peripheral surface 20di of a tank outer wall portion 20d of the sub-tank 20, which is shaped into a plate form. Similar to the curved wall surface 52 and the guide wall surface 54, the U-turn wall surface 56 is substantially perpendicular to the deepest bottom part 20e of the bottom portion 20a and thereby extends in the vertical direction, and the U-turn wall surface 56 continuously extends on both of the upper side and the lower side of the flow outlet 469b. The U-turn wall surface 56 continuously extends in a form of a U-shape in the top view from an opposite end 52c of the curved wall surface 52, which is opposite from the adjacent end 52a.

A portion of the U-turn wall surface 56 of the present embodiment, which is formed in the longitudinal wall portion 28 and extends smoothly and continuously from the curved wall surface 52, forms a first continuous curved portion 56a. The first continuous curved portion 56a is in a form of a cylindrical concave surface and is slightly curved toward the flow outlet 469b with a curvature, which is smaller than a curvature of the curved wall surface 52. Furthermore, another portion of the U-turn wall surface 56, which is formed in the tank outer wall portion 20d and is bent from the first continuous curved portion 56a toward the flow outlet 469b, forms a second continuous curved portion 56b. The second continuous curved portion 56b is in a form of a cylindrical concave surface and is curved toward the flow outlet 469b with a curvature, which is larger than the curvature of the first continuous curved portion 56a. Additionally, another portion of the U-turn wall surface 56, which is formed in the tank outer wall portion 20d and is bent from the second continuous curved portion 56b toward the guide wall surface 54, forms a return portion 56c. The return portion 56c is returned in a two-step form in the top view. With the above-described structure, as indicated by the arrow in FIG. 13, the fuel flow Ff, which is curved by the curved wall surface 52, is turned to make a U-turn along the U-turn wall surface 56, so that the fuel flow Ff is swirled in the clockwise direction in the top view in the present embodiment.

(Operation and Advantages)

With the swirling wall structure 50 of the first embodiment, the fuel flow Ff, which is outputted into the inside of the sub-tank 20 from the flow outlet 469b that is directed toward the lateral side and is formed in the diffuser passage 469 provided for drawing the fuel from the fuel tank 2 through the fuel discharge from the nozzle passage 465, is swirled. Specifically, the fuel flow Ff, which is outputted from the flow outlet 469b, is curved along the curved wall surface 52, which is curved about the longitudinal axis LI that extends from the lower side toward the upper side in the sub-tank 20. Thereafter, this fuel flow Ff is turned to make the U-turn along the U-turn wall surface 56, which extends continuously from the curved wall surface 52, so that the fuel flow Ff is swirled. In this way, air bubbles, which are contained in the fuel and have a small specific gravity, are concentrated in a center part of the swirl flow, so that a cluster of air bubbles is formed in the center part of the swirl flow in a manner that increases a buoyant force exerted to the air bubbles. Therefore, upward movement of the cluster of air bubbles is not likely interfered by the swirling wall structure 50, which extends from the lower side toward the upper side. Furthermore, in the sub-tank 20, which is shaped into the tubular form having the bottom, the opening 20c, through which the jet pump 46 and the fuel pump 42 can be inserted into the inside of the sub-tank 20, is upwardly opened. Therefore, because of the upward movement of the cluster of air bubbles, the cluster of air bubbles can be easily discharged. Furthermore, the fuel pump 42 can draw all of the fuel of the sub-tank 20, from which the air bubbles are removed through use of the swirling wall structure 50, and the fuel pump 42 can discharge this drawn fuel toward the internal combustion engine 3. Therefore, the supply loss of the fuel can be limited.

As discussed above, according to the first embodiment, the energy saving can be achieved by limiting the supply loss of the fuel, and at the same time, ensuring of the required performance of the internal combustion engine 3 can be achieved by removing the air bubbles.

Furthermore, because of the curved wall surface 52 and the U-turn wall surface 56 of the swirling wall structure 50, which extend continuously on both of the upper side and the lower side of the flow outlet 469b, the fuel flow Ff, which is outputted from the flow outlet 469b, can be curved and turned to make the U-turn in the reliable manner while limiting escape of the fuel flow Ff. Thus, a generation efficiency of the swirl flow in the fuel flow Ff as well as a removal efficiency of the air bubbles can be increased, and thereby the reliability with respect to the ensuring of the required performance of the internal combustion engine 3 can be improved.

Furthermore, the curved wall surface 52 and the U-turn wall surface 56 of the swirling wall structure 50, which extend upwardly from the bottom portion 20a of the sub-tank 20 in the vertical direction, can adjust the axial direction of the central axis of the swirl flow, which is generated in the fuel flow Ff, to coincide with the vertical direction. Thereby, the cluster of air bubbles, which is concentrated in the center part of the swirl flow, can be smoothly moved in the vertical direction, in which the buoyant force is applied to the cluster of air bubbles. Thus, the removal efficiency of the air bubbles can be improved, and thereby the reliability with respect to the ensuring of the required performance of the internal combustion engine 3 can be improved.

Furthermore, the air bubbles are discharged along with fuel in the projected area Ap, which is formed by projecting the flow outlet 469b on the lateral side of the flow outlet 469b. Therefore, at the curved wall surface 52, the fuel flow Ff, which contains the air bubbles, has a higher rate of colliding against the spaced curved portion 52b, which is spaced from the flow outlet 469b on the downstream side of the flow outlet 469b, in comparison to the adjacent end 52a, which is spaced from the projected area Ap in the top view. Thus, the fuel flow Ff is reliably curved along the curved configuration of the curved wall surface 52. Thereby, it is possible to limit an occurrence of that the fuel flow Ff, which contains the air bubbles, does not flow to the curved wall surface 52, to cause remaining of the air bubbles in the fuel. Thus, the reliability with respect to the ensuring of the required performance of the internal combustion engine 3 can be improved.

In addition, the fuel flow, which is discharged from the flow outlet 469b, is curved along the curved wall surface 52 that is curved about the longitudinal axis LI in the form of the cylindrical concave surface that circumferentially extends substantially ¼ turn, so that the fuel flow can reliably swirled about the longitudinal axis LI. Additionally, the fuel flow Ff, which is discharged from the flow outlet 469b, is guided along the continuous curved portions 56a, 56b of the U-turn wall surface 56, which are continuously curved from the curved wall surface 52 toward the flow outlet 469b, so that the swirl flow about the longitudinal axis LI is not likely interfered. Thus, the generation efficiency of the swirl flow in the fuel flow Ff as well as the removal efficiency of the air bubbles can be increased, and thereby the reliability with respect to the ensuring of the required performance of the internal combustion engine 3 can be improved.

Furthermore, the fuel flow Ff, which is discharged from the flow outlet 469b, is guided by the guide wall surface 54, so that the fuel flow Ff can be reliably curved along the curved configuration of the curved wall surface 52, which extends continuously from the guide wall surface 54 and is curved about the longitudinal axis LI. Thus, a generation efficiency of the swirl flow in the fuel flow Ff as well as a removal efficiency of the air bubbles can be increased, and thereby the reliability with respect to the ensuring of the required performance of the internal combustion engine 3 can be improved.

Furthermore, in the diffuser passage 469, the fuel flow Ff, which is discharged from the nozzle passage 465, is swirled about the transverse axis Lc, which extends from the nozzle passage 465 toward the lateral side. At this time, the fuel flow Ff is discharged from the flow outlet 469b of the diffuser passage 469 in such a manner that the fuel flow Ff is swirled in the counterclockwise direction in the view taken from the nozzle passage 465. Then, this fuel flow Ff collides against the curved wall surface 52, which is curved from the adjacent end 52a in the clockwise direction in the top view, so that this fuel flow Ff is upwardly swirled in this clockwise direction. Accordingly, the action of the swirling and the action of the buoyant force are combined, so that the moving speed of the cluster of air bubbles, which is directed from the center part of the swirl flow toward the upper side, can be increased. Therefore, the removal efficiency of the air bubbles can be increased, and thereby the reliability with respect to the ensuring of the required performance of the internal combustion engine 3 can be improved.

Second Embodiment

As shown in FIGS. 14 to 17, a second embodiment of the present disclosure is a modification of the first embodiment. In a jet pump 2046 of the second embodiment, in a cross sectional view of FIGS. 15, 16, which show the upstream end 465bu of the flow restricting passage part 465b taken from the communicating passage part 465a side, the second passage wall surface 2461as is curved from the pressurizing passage 464 side in the clockwise direction. The rest of the construction of the second passage wall surface 2461as, which is other than the above-described points, is the same as that of the second passage wall surface 461as of the first embodiment. Because of the above structure, as indicated by an arrow in FIG. 18(a), the fuel flow Ff is swirled along the second passage wall surface 2461as and enters the flow restricting passage part 465b. Thereby, as indicated by an arrow in FIGS. 18(b) and 18(c), the fuel flow Ff is swirled in the diffuser passage 469 in the clockwise direction about the transverse axis Lc in the view taken from the flow restricting passage part 465b.

Figure 14:
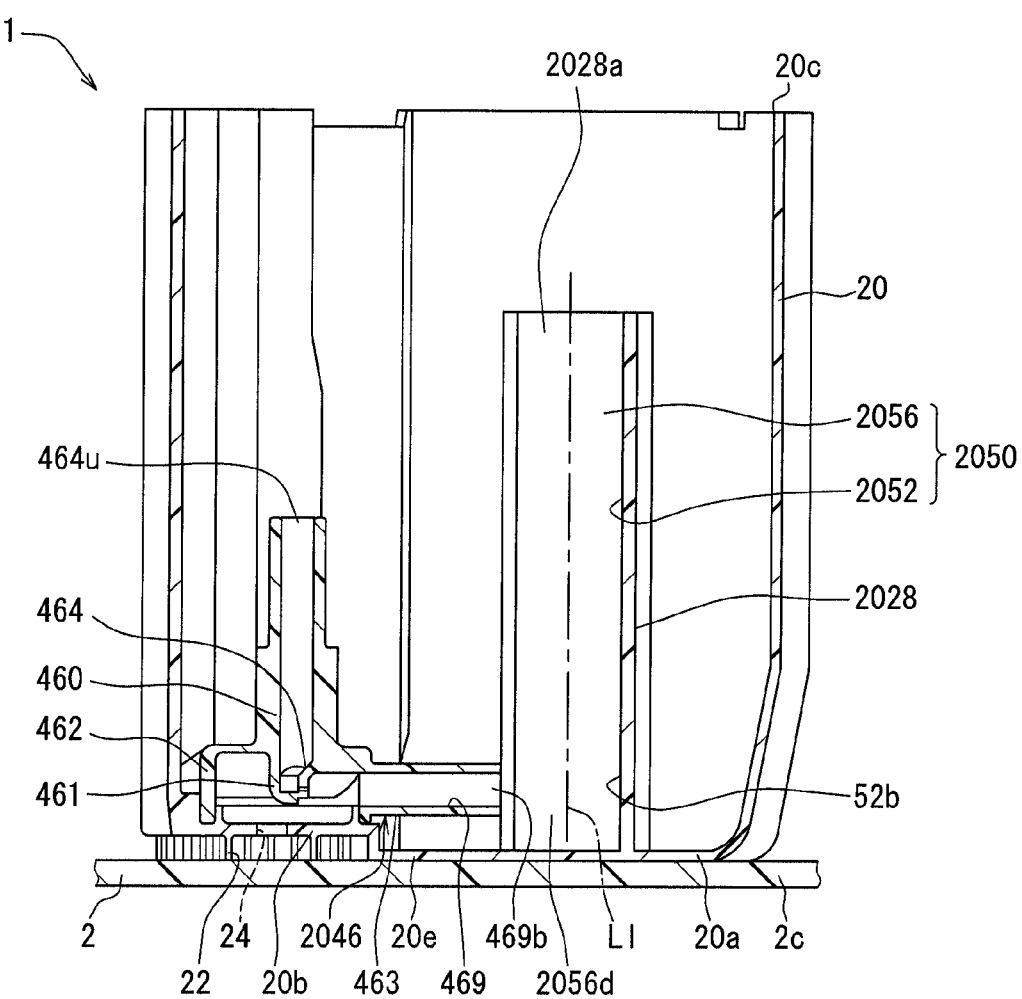
FIG. 14 is a cross sectional view, which corresponds to FIG. 3 and shows a fuel supply device according to a second embodiment of the present disclosure.
Figure 15:
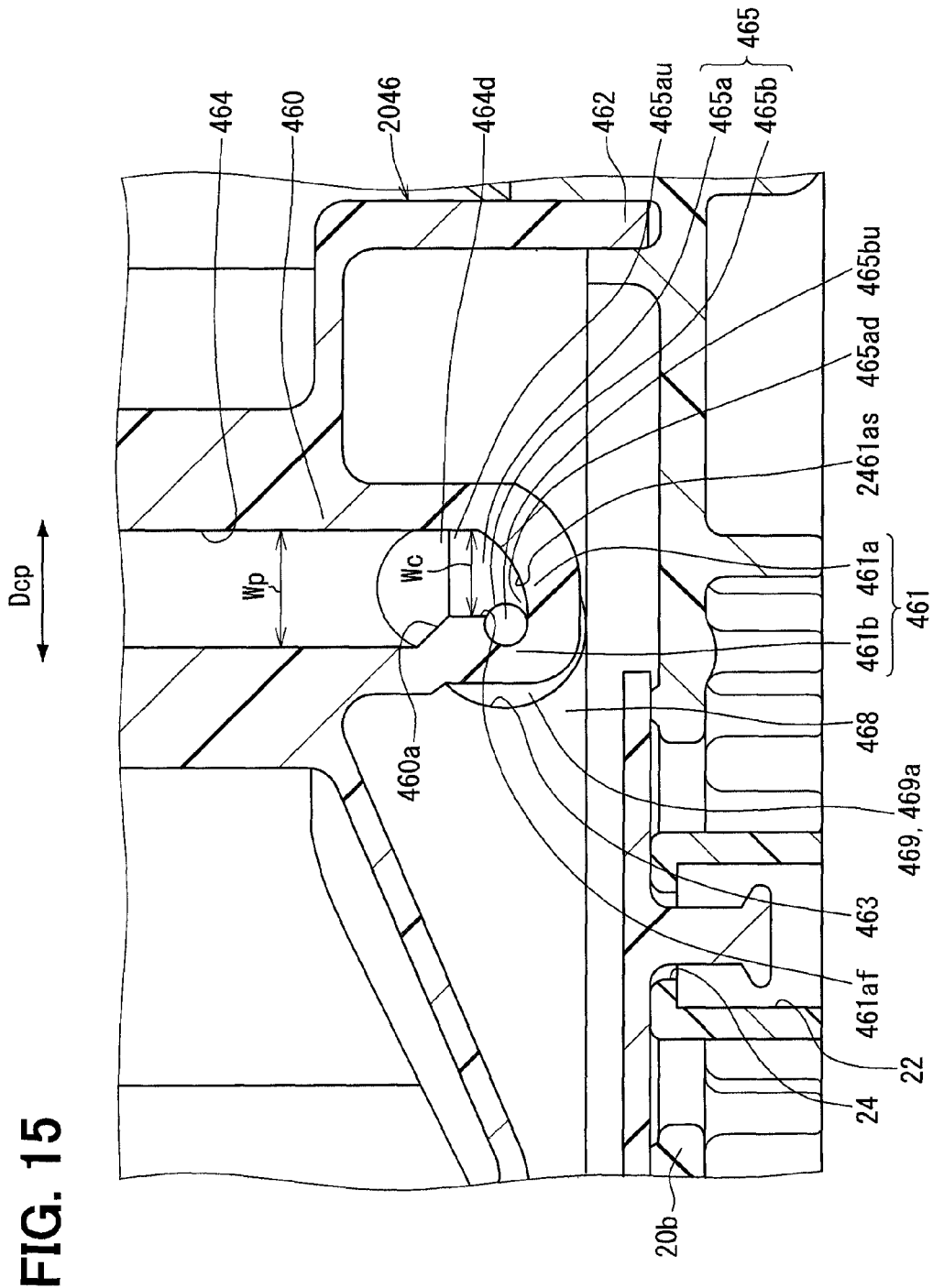
FIG. 15 is a cross sectional view, which corresponds to FIG. 6 and shows the fuel supply device of FIG. 14.
Figure 16:
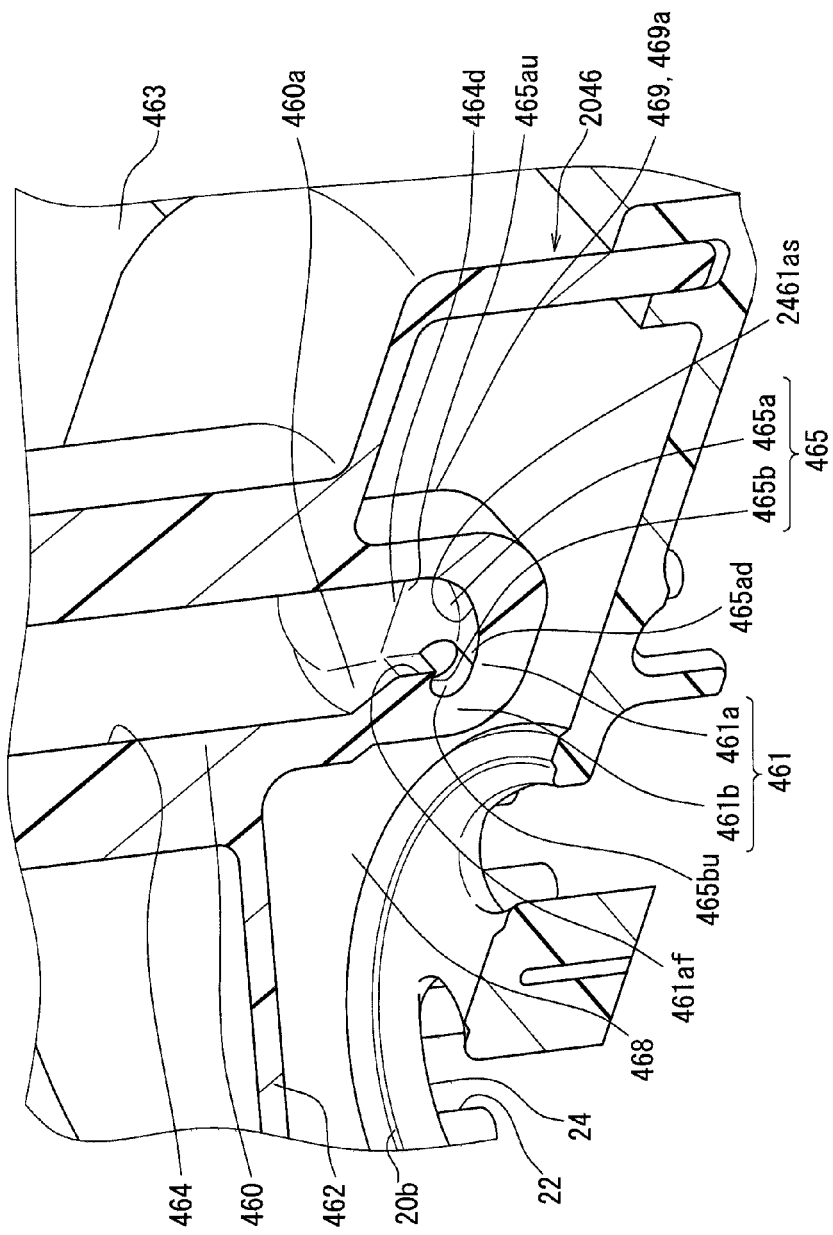
FIG. 16 is partially cross sectioned perspective view showing the fuel supply device of FIG. 14.
Figure 17:
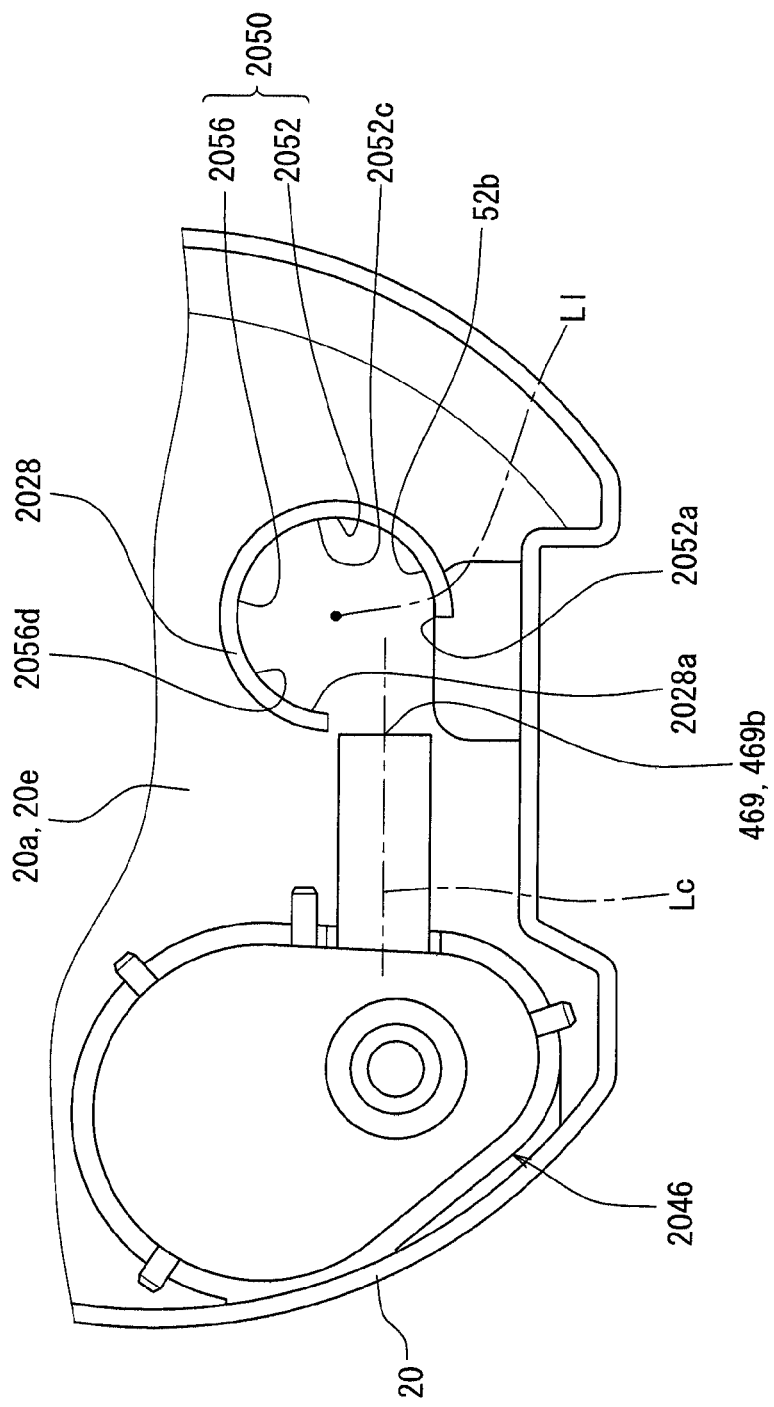
FIG. 17 is a top view showing the fuel supply device of FIG. 14.
Figure 18:
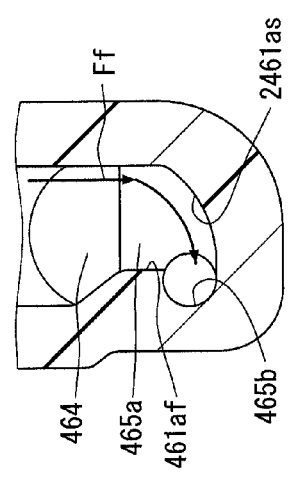
FIG. 18($a$) is a schematic diagram, which corresponds to FIGS. 4 and 6 and is for describing a fuel flow generated in the fuel supply device of FIG. 14, and FIG. 18($b$) is a schematic diagram, which corresponds to a cross sectional view taken along line XVIIIb-XVIIIb in FIG. 18($c$) and is for describing the fuel flow generated in the fuel supply device of FIG. 14, and FIG. 18($c$) is a schematic diagram, which corresponds to FIG. 3 and is for describing the fuel flow generated in the fuel supply device of FIG. 14.
Figure 18:
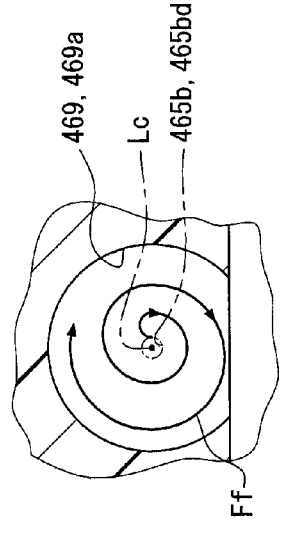
Figure 18:
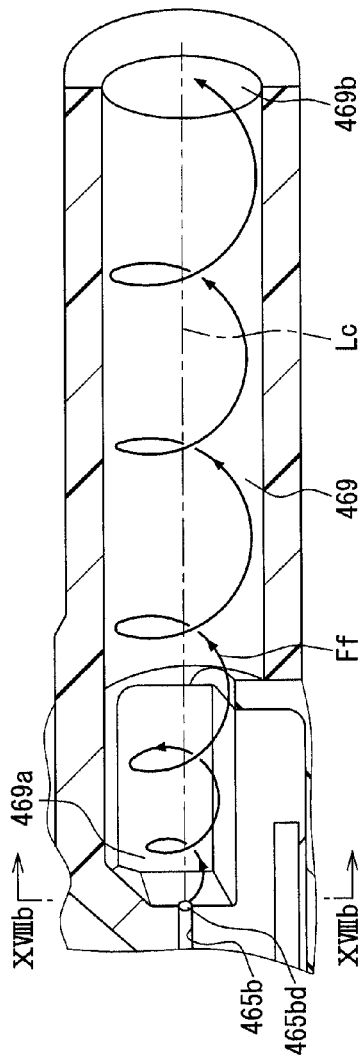
Figure 19:
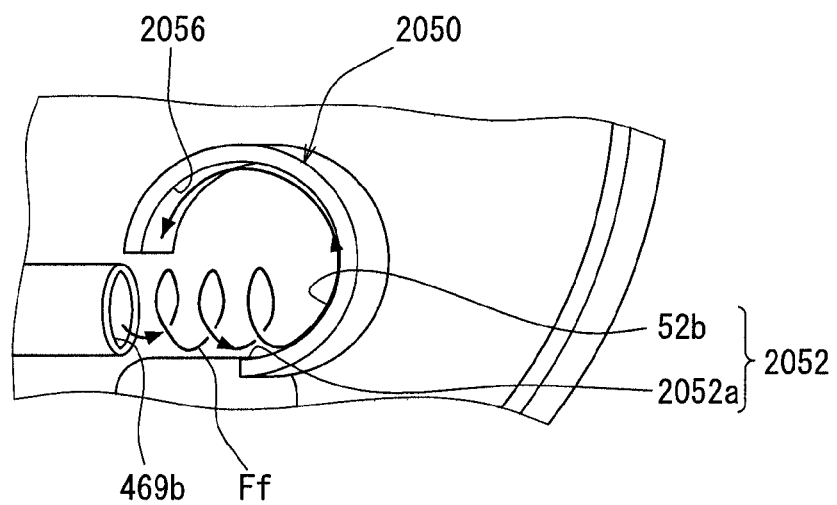
FIG. 19 is a schematic diagram for describing the fuel flow generated in the fuel supply device of FIG. 14.

As shown in FIGS. 14 and 17, in the swirling wall structure 2050 of the second embodiment, the curved wall surface 2052 is formed in a portion of the inner peripheral surface 2028a of the longitudinal wall portion 2028, which is molded integrally with the sub-tank 20 and is shaped into a partially cylindrical form. The curved wall surface 2052 is curved about the longitudinal axis LI in a form of a cylindrical concave surface that circumferentially extends substantially ¼ turn. This curved wall surface 2052 is curved from the adjacent end 2052a of the curved wall surface 2052, which is adjacent to the flow outlet 469b, in the counterclockwise direction in the top view. The rest of the construction of the curved wall surface 2052, which is other than the above-described points, is the same as that of the curved wall surface 52 of the first embodiment. Because of the construction of the curved wall surface 2052, as indicated by the arrow in FIG. 19, when the fuel flow Ff collides against the spaced curved portion 52b, the fuel flow Ff flows along the curved wall surface 2052. Thereby, the fuel flow Ff is curved in the counterclockwise direction in the top view.

As shown in FIGS. 14 and 17, the guide wall surface 54 of the first embodiment is not formed in the swirling wall structure 2050 of the second embodiment. Furthermore, in the swirling wall structure 2050, the U-turn wall surface 2056 is formed by a portion of the inner peripheral surface 2028a of the longitudinal wall portion 2028, which is in common with the curved wall surface 2052. The U-turn wall surface 2056, which is in a form of a cylindrical concave surface that circumferentially extends substantially ½ turn, extends continuously in generally a U-shape form in the top view from an opposite end 2052c of the curved wall surface 2052, which is opposite from the adjacent end 2052a of the curved wall surface 2052. The U-turn wall surface 2056 forms a continuous curved portion 2056d, which extends smoothly from the curved wall surface 2052 and is cured toward the flow outlet 469b with substantially the same curvature as a curvature of the curved wall surface 2052 along the entire circumferential extent of the continuous curved portion 2056d. The rest of the construction of the U-turn wall surface 2056, which is other than the above-described points, is the same as that of the U-turn wall surface 56 of the first embodiment. With the above-described structure, as indicated by the arrow in FIG. 19, the fuel flow Ff, which is curved by the curved wall surface 2052, is turned to make the U-turn along the U-turn wall surface 2056, so that the fuel flow Ff forms the swirl flow, which is swirled in the counterclockwise direction in the top view.

Even in the second embodiment described above, the fuel flow Ff, which is discharged from the nozzle passage 465, is swirled in the diffuser passage 469 about the transverse axis Lc that extends laterally from the nozzle passage 465. The fuel flow Ff is discharged from the flow outlet 469b of the diffuser passage 469 in such a manner that the fuel flow Ff is swirled in the clockwise direction in the view taken from the nozzle passage 465. In the top view, this fuel flow Ff collides against the curved wall surface 2052 that is curved from the adjacent end 2052a, which is adjacent to the flow outlet 469b, in the counterclockwise direction, so that this fuel flow Ff is upwardly swirled in this counterclockwise direction. Accordingly, the action of the swirling and the action of the buoyant force are combined, so that the moving speed of the cluster of air bubbles, which is directed from the center part of the swirl flow toward the upper side, can be increased. Therefore, the removal efficiency of the air bubbles can be increased, and thereby the reliability with respect to the ensuring of the required performance of the internal combustion engine 3 can be improved. Other operations and advantages of the second embodiment, which are other than the above-described ones, are the same as those of the first embodiment except the operations and the advantages with respect to the guide wall surface 54.

Third Embodiment

Figure 20:
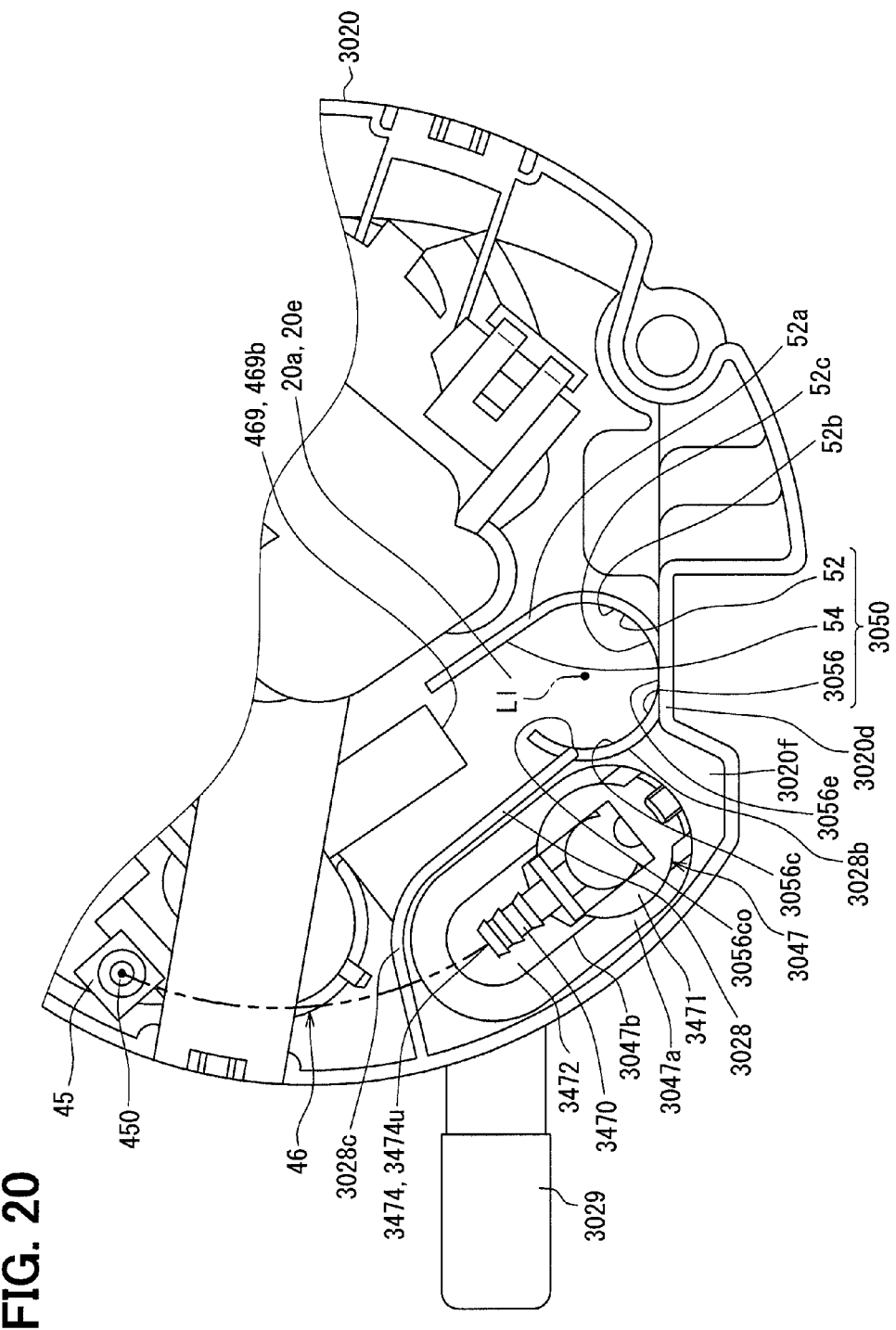
FIG. 20 is a plan view showing a fuel supply device according to a third embodiment of the present disclosure.
Figure 21:
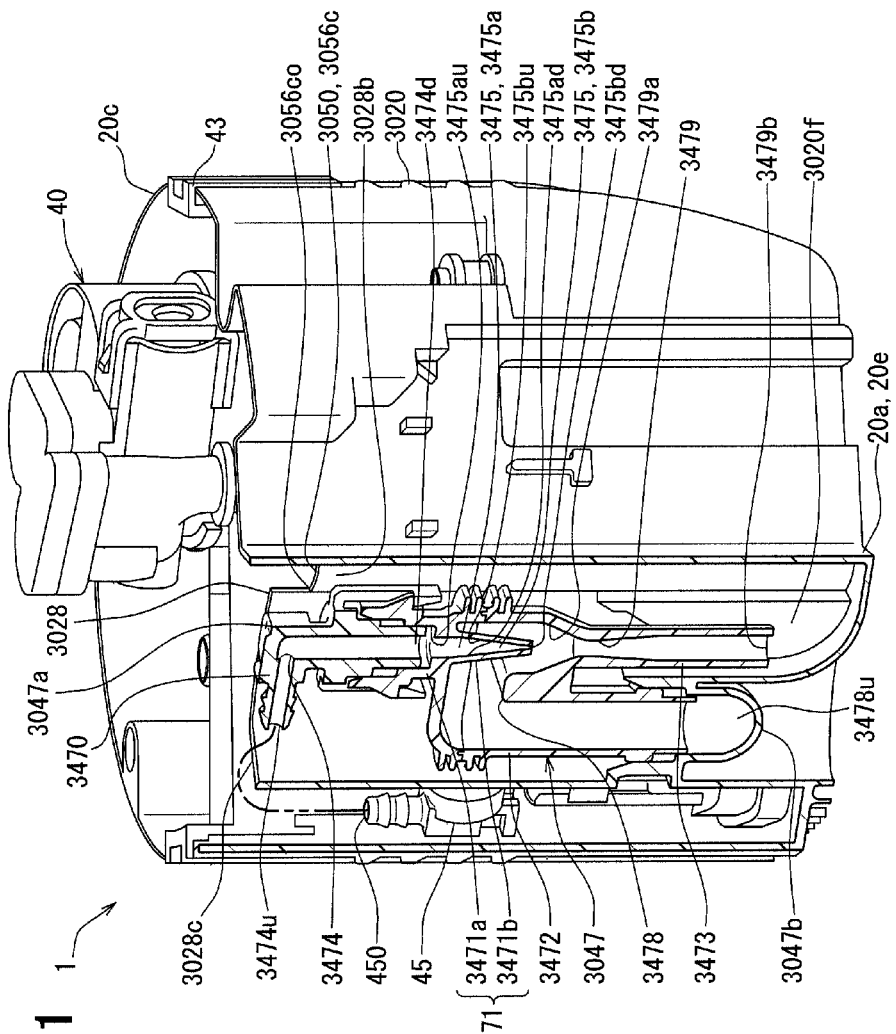
FIG. 21 is a partially cross sectioned perspective view showing the fuel supply device of FIG. 20.
Figure 22:
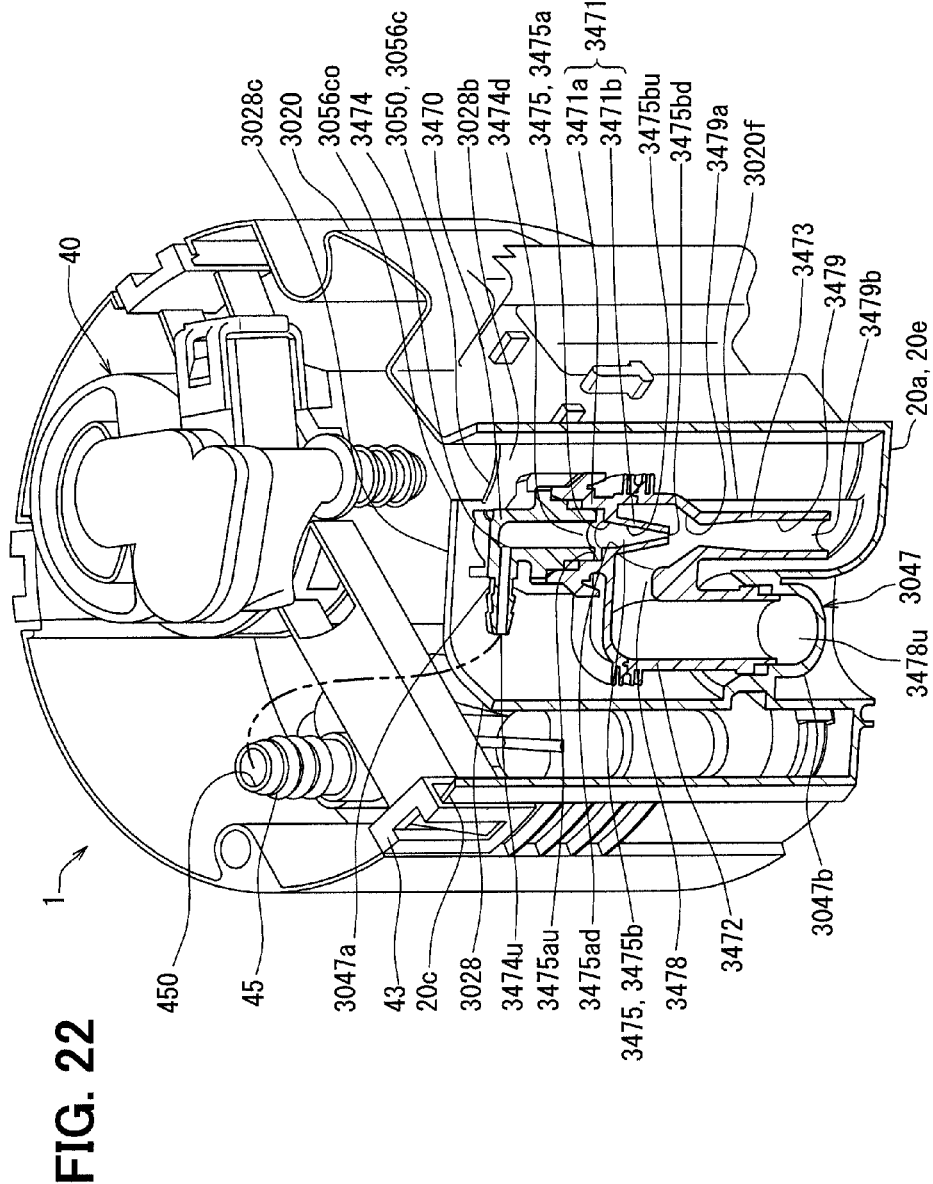
FIG. 22 is another partially cross sectioned perspective view showing the fuel supply device of FIG. 20.

As shown in FIGS. 20 to 22, a third embodiment of the present disclosure is a modification of the first embodiment. As shown in FIG. 20, the sub-tank 3020 of the third embodiment includes an inflow tube 3029, which is made of resin and is molded integrally with the sub-tank 3020 or separately from the sub-tank 3020. The inflow tube 3029 is communicated with the inside of the fuel tank 2 at a location, which is laterally displaced from the lower side of the sub-tank 3020. Also, the inflow tube 3029 is communicated with a jet pump 3047, which is provided separately from the jet pump 46 in the inside of the sub-tank 3020 in the fuel tank 2. In the third embodiment, the jet pump 46 is defined as a first jet pump 46, and the jet pump 3047 is defined as a second jet pump 3047.

As shown in FIGS. 20-22, the second jet pump 3047 is received in a pump chamber 3020f of the sub-tank 3020. The pump chamber 3020f is partitioned from the first jet pump 46 by a longitudinal wall portion 3028, which is molded integrally with the sub-tank 3020 and is shaped into a plate form. The pump chamber 3020f, which is partitioned in the above-described manner, is formed such that the wall surfaces 52, 54, 3056 of the swirling wall structure 3050 are not exposed in the pump chamber 3020f. The construction of the sub-tank 3020 is the same as the sub-tank 20 of the first embodiment except the above-described points.

The second jet pump 3047, which is made of resin and is shaped into a hollow form, includes a pressurizing portion 3470, a nozzle portion 3471, a suctioning portion 3472, and a diffuser portion 3473. A molded article 3047b, in which the nozzle portion 3471, the suctioning portion 3472 and the diffuser portion 3473 are integrally molded, is assembled to a molded article 3047a, in which the pressurizing portion 3470 is molded, so that the second jet pump 3047 is formed.

The pressurizing portion 3470 forms a pressurizing passage 3474, which is in a form of a cylindrical hole that extends in a L-shape form. An upstream end 3474u of the pressurizing passage 3474 is communicated with the discharge outlet 450 of the residual pressure holding valve 45 along with the pressurizing passage 464 of the first jet pump 46.

As shown in FIGS. 21 and 22, the nozzle portion 3471 includes a communication forming part 3471a and a flow restriction forming part 3471b, which are placed on the lower side of the pressurizing portion 3470. The communication forming part 3471a forms a communicating passage part 3475a as an upstream part of a nozzle passage 3475. The flow restriction forming part 3471b forms a flow restricting passage part 3475b as a downstream part of the nozzle passage 3475. The communication forming part 3471a forms the communicating passage part 3475a in a form of stepped cylindrical hole. An upstream end 3475au of the communicating passage part 3475a is communicated with a downstream end 3474d of the pressurizing passage 3474. The flow restricting passage part 3475b forms the flow restricting passage part 3475b in a form of a conical hole (tapered hole), which has a diameter that is progressively reduced toward the lower side. A flow rate of the fuel in the flow restricting passage part 3475b is further restricted in comparison to a flow rate of the fuel in the communicating passage part 3475a. An upstream end 3475bu of the flow restricting passage part 3475b is communicated with a downstream end 3475ad of the communicating passage part 3475a.

The suctioning portion 3472 forms a suction passage 3478 in a form a cylindrical hole that extends in a form an inverted L-shape. An upstream end 3478u of the suction passage 3478 is communicated with the inflow tube 3029 (see FIG. 20) at a location that is on the lower side of the pressurizing portion 3470.

The diffuser portion 3473 forms a diffuser passage 3479 in a form of a cylindrical hole that is coaxial with the flow restricting passage part 3475b and extends in the vertical direction. An upstream end of the diffuser passage 3479 cooperates with the suction passage 3478 to form a confluence passage portion 3479a, which is communicated with a downstream end 3475bd of the flow restricting passage part 3475b on the lower side of the pressurizing portion 3470. A downstream end of the diffuser passage 3479 forms a flow outlet 3479b, which is directed downward and is communicated with the pump chamber 3020f.

With the above-described construction of the second jet pump 3047, the flow of pressurized fuel, which is guided by the pressurizing passage 3474 from the discharge outlet 450 and is supplied to the communicating passage part 3475a, is restricted by the flow restricting passage part 3475b and is thereby discharged into the confluence passage portion 3479a. Therefore, a negative pressure is generated around the discharged flow of fuel, so that the fuel stored in the fuel tank 2 is drawn through the inflow tube 3029 at the lateral part of the sub-tank 3020 and is drawn into the suction passage 3478 and the diffuser passage 3479 in this order. Furthermore, the drawn fuel receives a diffuser effect in the diffuser passage 3479 and is thereby pumped, so that the fuel is pumped into the pump chamber 3020f through the flow outlet 3479b of the diffuser passage 3479.

As shown in FIG. 20, the swirling wall structure 3050 of the third embodiment includes the curved wall surface 52 and the guide wall surface 54, which are substantially identical to the curved wall surface 52 and the guide wall surface 54 of the first embodiment, and the U-turn wall surface 3056, which is different from the U-turn wall surface 56 of the first embodiment. In the top view, the U-turn wall surface 3056, which is shaped into a generally U-shape form, has a continuous planar surface portion 3056e, which is formed in a tank outer wall portion 3020d. The continuous planar surface portion 3056e extends continuously from an opposite end 52c of the curved wall surface 52, which is opposite from the adjacent end 52a of the curved wall surface 52. The continuous planar surface portion 3056e is in a form of a planar surface that is bent relative to the curved wall surface 52 toward the flow outlet 469b. Furthermore, the U-turn wall surface 3056 has a return portion 3056c, which is formed in the longitudinal wall portion 3028 that partitions the pump chamber 3020f. The return portion 3056c is returned from the continuous planar surface portion 3056e toward the guide wall surface 54. The return portion 3056c is in a form of a cylindrical concave surface and is curved with a curvature that is smaller than a curvature of the curved wall surface 52. The rest of the construction of the U-turn wall surface 3056, which is other than the above-described points, is the same as that of the U-turn wall surface 56 of the first embodiment.

As shown in FIGS. 20 to 22, the longitudinal wall portion 3028 has a portion 3028b that forms the return portion 3056c. A height of this portion 3028b, which is measured from the deepest bottom part 20e of the bottom portion 20a in the vertical direction, is set to be lower than that of the other part 3028c of the longitudinal wall portion 3028. With this setting, a confluence opening 3056co, which communicates between the inside and the outside of the pump chamber 3020f, is opened at an upper end of the return portion 3056c.

Figure 23:
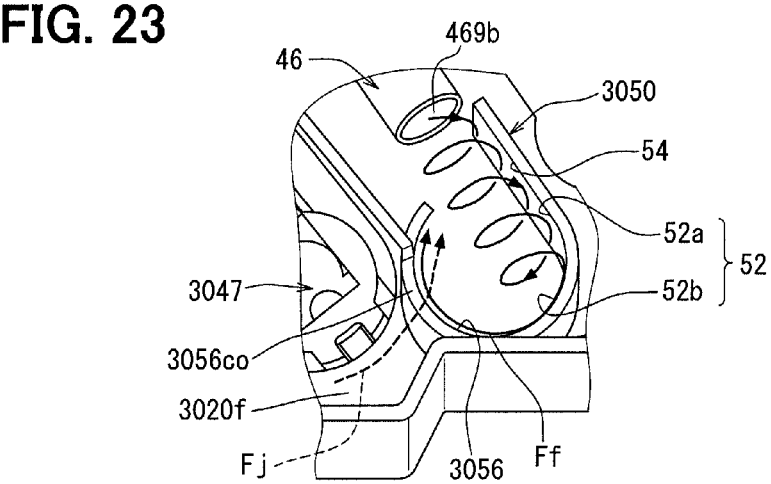
FIG. 23 is a schematic diagram for describing a fuel flow generated in the fuel supply device of FIG. 20.

With the above-described construction of the swirling wall structure 3050, as indicated by an arrow in FIG. 23, the fuel flow Ff, which is guided by the guide wall surface 54 from the flow outlet 469b of the first jet pump 46 and is curved by the curved wall surface 52, is turned to make a U-turn along the U-turn wall surface 3056. Therefore, even in the third embodiment, the fuel flow Ff is swirled in the clockwise direction in the top view. Furthermore, a fuel flow Fj, which is pumped to the pump chamber 3020f by the second jet pump 3047 and is discharged from the pump chamber 3020f through the confluence opening 3056co, is merged with the fuel flow Ff, which is discharged from the flow outlet 469b. At this time, the fuel flow Fj, which is outputted from the second jet pump 3047, is merged with the fuel flow Ff, which is upwardly swirled because of the principle that is the same as that of the first embodiment. Therefore, the fuel flow Fj also forms the swirl flow in a manner similar to that of fuel flow Ff.

Thus, in the third embodiment described above, in addition to the air bubbles of the fuel, which is drawn by the first jet pump 46 from the location on the lower side of the sub-tank 3020, the air bubbles of the fuel, which is drawn by the second jet pump 3047 from the other location that is other than the location on the lower side of the sub-tank 3020, can be also removed. Accordingly, while the swirling wall structure, which can achieve the air bubble removing function and the fuel supply loss limiting function, is commonly used in both of the first jet pump 46 and the second jet pump 3047 to simplify the construction, both of the energy saving and the ensuring of the required performance of the internal combustion engine can be achieved. Furthermore, besides the above-described advantages, the present embodiment can achieve the advantages, which are similar to those of the first embodiment.

Other Embodiments

The various embodiments of the present disclosure are described above. However, the present disclosure should not be limited to these embodiments. The present disclosure may be applied to various other embodiments as well as combinations of the above-described embodiments without departing from the scope of the present disclosure.

Specifically, in a first modification with respect to the first to third embodiments, at least one of the wall surfaces 52, 2052, 54, 56, 2056, 3056 of the swirling wall structures 50, 2050, 3050 may be extended downward from the opposed location, which is opposed to the flow outlet 469b, so that the at least one of the wall surfaces 52, 2052, 54, 56, 2056, 3056 is not placed above the opposing location. In a second modification with respect to the first to third embodiments, at least one of the wall surfaces 52, 2052, 54, 56, 2056, 3056 of the swirling wall structures 50, 2050, 3050 may be extended upward from the opposed location, which is opposed to the flow outlet 469b, so that the at least one of the wall surfaces 52, 2052, 54, 56, 2056, 3056 is not placed below the opposing location. The wall surface, which is subject to the second modification, may be extended upward from the bottom portion 20a of the sub-tank 20, 3020 or may be extended upward from a location that is spaced from the bottom portion 20a.

In a third modification with respect to the first to third embodiments, at least one of the wall surfaces 52, 2052, 54, 56, 2056, 3056 of the swirling wall structures 50, 2050, 3050 may be tilted relative to the vertical direction. In a fourth modification with respect to the first to third embodiments, the longitudinal axis LI, which is tilted relative to the vertical direction, may be used for the curved wall surface 52, 2052 of the swirling wall structure 50, 2050, 3050 as long as the longitudinal axis LI extends from the lower side to the upper side of the sub-tank 20, 3020. In a fifth modification with respect to the first to third embodiments, the adjacent end 52a, 2052a of the curved wall surface 52, 2052 of the swirling wall structure 50, 2050, 3050 may be placed in the projected area Ap.

In a sixth modification with respect to the first to third embodiments, the curved wall surface 52, 2052 of the swirling wall structure 50, 2050, 3050 may be curved in a form of a cylindrical concave surface that circumferentially extends more than ¼ turn about the longitudinal axis LI. In a seventh modification with respect to the first to third embodiments, the curved wall surface 52, 2052 of the swirling wall structure 50, 2050, 3050 may be formed in a form of a cylindrical concave surface that circumferentially extends less than ¼ turn about the longitudinal axis LI. In an eighth modification with respect to the first to third embodiments, the curved wall surface 52, 2052 of the swirling wall structure 50, 2050, 3050 may be curved in a form that is other than the cylindrical concave surface.

In a ninth modification with respect to the first and second embodiments, the continuous curved portion(s) 56a, 56b, 2056d may be eliminated from the U-turn wall surface 56, 2056 of the swirling wall structure 50, 2050, and a continuous planar surface portion, which is similar to, for example, the continuous planar surface portion 3056e of the third embodiment, may be provided. In a tenth modification with respect to the first and third embodiments, the guide wall surface 54 may be eliminated.

Figure 24:
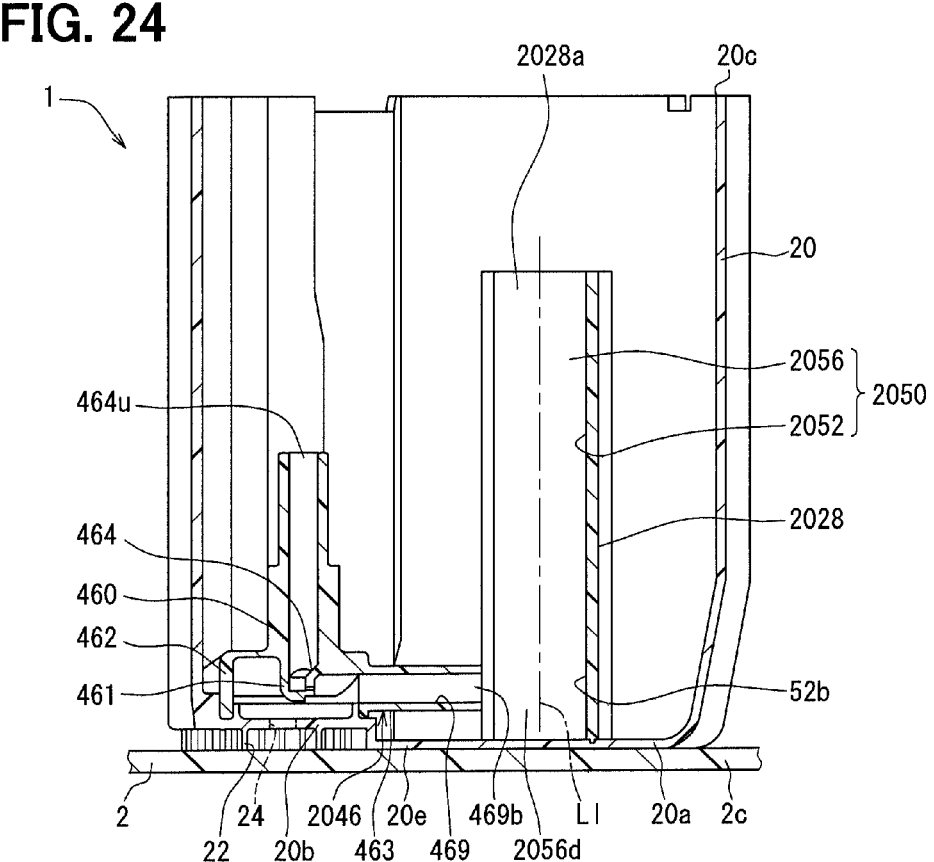
FIG. 24 is a cross sectional view showing a modification of FIG. 14.

In an eleventh modification with respect to the second embodiment, as shown in FIG. 24, the respective wall surfaces 2052, 2056 of the swirling wall structure 2050 may be formed by a longitudinal wall portion 2028, which is molded separately from the sub-tank 20 and is thereafter fixed to the sub-tank 20. In a twelfth modification with respect to the third embodiment, in place of the swirling wall structure 3050, a swirling wall structure, which is similar to the swirling wall structure 50, 2050 of the first or second embodiment may be used.

In the jet pump 46 according to a thirteenth modification with respect to the first and third embodiments, in a cross sectional view, in which the upstream end 465bu of the flow restricting passage part 465b is seen from the communicating passage part 465a side, the second passage wall surface 461as may be curved from the pressurizing passage 464 side in the clockwise direction. In the swirling wall structure 50, 3050 of this case, the curved wall surface 52 may be curved in the counterclockwise direction from the adjacent end 52a, which is adjacent to the flow outlet 469b, in the top view.

In the jet pump 2046 according to a fourteenth modification with respect to the second embodiment, in the cross sectional view, in which the upstream end 465bu of the flow restricting passage part 465b is seen from the communicating passage part 465a side, the second passage wall surface 2461as may be curved from the pressurizing passage 464 in the counterclockwise direction. In the swirling wall structure 2050 of this case, the curved wall surface 2052 may be curved in the clockwise direction from the adjacent end 2052a, which is adjacent to the flow outlet 469b, in the top view.

In a fifteenth modification with respect to the first to third embodiments, the second passage wall surface 461as, 2461as may be not curved and may be formed in a form of, for example, a planar surface to generate the fuel flow Ff, which flows in the transverse axis Lc, in the diffuser passage 469. In a sixteenth modification with respect to the first to third embodiments, a portion of the jet pump 46, 2046 may be molded separately from the rest of the jet pump 46, 2046 and may be fixed to the rest of the jet pump 46, 2046 later.

The invention claimed is:

1. A fuel supply device that supplies fuel from a fuel tank toward an internal combustion engine located at an outside of the fuel tank, the fuel supply device comprising:
   a sub-tank that is placed in an inside of the fuel tank and is shaped into a tubular body that has a bottom, wherein an opening of the sub-tank is opened toward an upper side;
   a jet pump that is received in an inside of the sub-tank, wherein the jet pump discharges pressurized fuel from a nozzle passage into a diffuser passage in the jet pump and thereby pumps stored fuel, which is stored in the fuel tank, into the inside of the sub-tank through the diffuser passage;
a fuel pump that is received in the inside of the sub-tank, wherein the fuel pump draws the fuel pumped into the sub-tank by the jet pump and discharges the drawn fuel toward the internal combustion engine; and
a swirling wall structure that extends from a lower side toward an upper side in the sub-tank and is spaced from a flow outlet of the diffuser passage opened toward a lateral side, wherein:
a fuel flow, which is outputted into the inside of the sub-tank from the flow outlet of the diffuser passage, is swirled by the swirling wall structure, and the swirling wall structure, which is assumed to have a longitudinal axis extending from the lower side to the upper side of the sub-tank, includes:
   a curved wall surface that is curved about the longitudinal axis to bend the fuel flow outputted from the flow outlet; and
   a U-turn wall surface that extends continuously from the curved wall surface to make a U-turn of the fuel flow, which is bent by the curved wall surface; and
an opening is located adjacent to the flow outlet of the diffuser passage at a location between the flow outlet of the diffuser passage and the swirling wall structure to enable an inflow of the fuel from an outside of the swirling wall structure into an inside of the swirling wall structure through the opening between the flow outlet of the diffuser passage and the swirling wall structure at a time when the fuel is outputted from the flow outlet of the diffuser passage.

2. The fuel supply device according to claim 1, wherein the swirling wall structure extends from a lower side of the flow outlet to an upper side of the flow outlet.

3. The fuel supply device according to claim 1, wherein the swirling wall structure extends upwardly from a bottom portion of the sub-tank in a vertical direction.

4. The fuel supply device according to claim 1, wherein when a projected area, which is formed by projecting the flow outlet toward the lateral side, is assumed to be present, an adjacent end of the curved wall surface, which is adjacent to the flow outlet in a top view taken from a top side of the curved wall surface, is located at an outside of the projected area, and a spaced curved portion of the curved wall surface, which is curved and is further spaced from the flow outlet in comparison to the adjacent end of the curved wall surface in the top view, is located in the projected area.

5. The fuel supply device according to claim 1, wherein the curved wall surface is curved into a form of an arcuate concave surface that circumferentially extends equal to or lager than ¼ turn about the longitudinal axis.

6. The fuel supply device according to claim 5, wherein the U-turn wall surface includes a continuous curved portion that extends continuously from the curved wall surface and is curved toward the flow outlet.

7. The fuel supply device according to claim 1, wherein:
the swirling wall structure includes a guide wall surface that guides the fuel flow, which is outputted from the flow outlet, to the curved wall surface; and
the curved wall surface extends continuously from the guide wall surface and is curved about the longitudinal axis, so that the curved wall surface bends the fuel flow, which is guided from the flow outlet.

8. The fuel supply device according to claim 1, wherein:
when a transverse axis, which extends from the nozzle passage toward the lateral side, is assumed to be present, the fuel flow, which is swirled about the transverse axis in a counterclockwise direction, is generated in the diffuser passage in a view taken from the nozzle passage through the discharging of the fuel from the nozzle passage; and
the curved wall surface is curved in a clockwise direction from an adjacent end of the curved wall surface, which is adjacent to the flow outlet, in a top view taken from a top side of the curved wall surface.

9. The fuel supply device according to claim 1, wherein:
when a transverse axis, which extends from the nozzle passage toward the lateral side, is assumed to be present, the fuel flow, which is swirled about the transverse axis in a clockwise direction, is generated in the diffuser passage in a view taken from the nozzle passage through the discharging of the fuel from the nozzle passage; and
the curved wall surface is curved in a counterclockwise direction from an adjacent end of the curved wall surface, which is adjacent to the flow outlet, in a top view taken from a top side of the curved wall surface.

10. The fuel supply device according to claim 1, wherein:
the jet pump is a first jet pump, which pumps the stored fuel of the fuel tank from a location on a lower side of the sub-tank into the inside of the sub-tank;
the fuel supply device comprises a second jet pump that is received in the inside of the sub-tank;
the second jet pump discharges pressurized fuel from a nozzle passage into a diffuser passage in the second jet pump and thereby pumps the stored fuel of the fuel tank from a corresponding location of the fuel tank, which is other than the location on the lower side of the sub-tank, into the inside of the sub-tank through the diffuser passage of the second jet pump; and
the swirling wall structure includes a confluence opening, through which a fuel flow outputted from a flow outlet of the diffuser passage of the second jet pump is merged with the fuel flow outputted from the flow outlet of the diffuser passage of the first jet pump.

\* \* \* \* \*